(12) United States Patent
Balooch et al.

(10) Patent No.: US 7,397,030 B1
(45) Date of Patent: Jul. 8, 2008

(54) INTEGRATED LOCAL AND GLOBAL OPTICAL METROLOGY FOR SAMPLES HAVING MINIATURE FEATURES

(75) Inventors: Mehdi Balooch, Berkeley, CA (US); Abdul Rahim Forouhi, Cupertino, CA (US)

(73) Assignee: n&k Technology, Inc., San Jose, CA (US)

( * ) Notice: Subject to any disclaimer, the term of this patent is extended or adjusted under 35 U.S.C. 154(b) by 264 days.

(21) Appl. No.: 11/445,749

(22) Filed: Jun. 1, 2006

(51) Int. Cl.
*H01J 37/00* (2006.01)

(52) U.S. Cl. ..................... 250/306; 250/307

(58) Field of Classification Search ............... 250/306, 250/307, 216, 234; 73/105
See application file for complete search history.

(56) References Cited

U.S. PATENT DOCUMENTS

| | | | |
|---|---|---|---|
| 5,017,007 A | 5/1991 | Milne et al. | 356/301 |
| 5,955,654 A | 9/1999 | Stover et al. | 73/1.89 |
| 5,994,691 A | 11/1999 | Konada | 250/234 |
| 6,000,281 A | 12/1999 | Burke | 73/105 |
| 6,052,238 A | 4/2000 | Ebbesen et al. | 359/738 |
| 6,194,711 B1 | 2/2001 | Tomita | 250/234 |
| 6,441,359 B1 | 8/2002 | Cozier et al. | 250/216 |
| 6,489,611 B1 | 12/2002 | Aumond et al. | 250/306 |
| 6,602,723 B1 | 8/2003 | Markle et al. | 438/5 |
| 6,617,569 B2 * | 9/2003 | Narita et al. | 250/216 |
| 6,621,079 B1 | 9/2003 | Shao et al. | 250/306 |
| 6,630,362 B1 | 10/2003 | Lensing | 438/14 |
| 6,643,012 B2 | 11/2003 | Shen et al. | 356/301 |
| 6,650,423 B1 | 11/2003 | Markle et al. | 356/601 |
| 6,658,922 B2 | 12/2003 | Leigh et al. | 73/105 |
| 6,668,628 B2 | 12/2003 | Hantschel et al. | 73/105 |
| 6,710,331 B2 * | 3/2004 | Narita et al. | 250/234 |
| 6,728,591 B1 | 4/2004 | Hussey, Jr. et al. | 700/121 |
| 6,850,323 B2 | 2/2005 | Anderson | 356/301 |
| 6,917,901 B2 | 7/2005 | Bowley, Jr. et al. | 702/189 |
| 6,980,937 B2 | 12/2005 | Hayes | 703/2 |
| 6,986,280 B2 | 1/2006 | Muckenhirm | 73/104 |
| 7,032,427 B2 | 4/2006 | Niwa et al. | 72/325 |
| 2003/0039429 A1 * | 2/2003 | Inoue et al. | 385/12 |
| 2004/0080757 A1 | 4/2004 | Stanke et al. | 356/601 |
| 2005/0128489 A1 | 6/2005 | Bao et al. | 356/601 |
| 2006/0064280 A1 | 3/2006 | Vuong et al. | 702/182 |

\* cited by examiner

*Primary Examiner*—Kiet T Nguyen
(74) *Attorney, Agent, or Firm*—Lumen Patent Firm, Inc.

(57) ABSTRACT

This invention relates to an apparatus and method for integrated measurement of a sample that has miniature features. The apparatus has an optical measuring unit for illuminating the sample with a global test radiation over an optical test region and obtaining an optical response, such as scattered or transmitted radiation from the optical test region. In addition, the apparatus has a local measuring unit for making a nanometer scale measurement of a local material parameter $\rho$ of the sample. The local parameter $\rho$ is determined with a mechanical, optical, magnetic, electric or other physical measurement performed in the nanometer range with a scanning probe tip at a test location lying within the optical test region. The material parameter $\rho$ is selected such that it is substantially constant or uniform over the illuminated area. A computational unit determines a property of the miniature features within the optical test region from the optical response supplemented with an adjustment derived from the local material parameter obtained by the local measuring unit.

46 Claims, 13 Drawing Sheets

INTEGRATED LOCAL AND GLOBAL OPTICAL METROLOGY FOR SAMPLES HAVING MINIATURE FEATURES

FIELD OF THE INVENTION

This invention relates generally to integrated test and measurement apparatus and methods, and in particular to methods that combine global optical measurement with local measurement performed by and scanning probe tip.

BACKGROUND ART

The art of metrology includes various methods and apparatus for examining sample characteristics. Some of these apparatus and methods are destructive, such as scanning electron microscopy (SEM) and some are non-destructive, such as scatterometry (e.g., ellipsometry and reflectometry). There are also some apparatus that can be employed in non-destructive mode and destructive mode, such as scanning probe microscopy (SPM) (for example, atom force microscopy (AFM) and magnetic force microscopy (MFM)).

There are numerous suggestions in the prior art to employ any of the above apparatus and methods to sample metrology. For example, in U.S. Pat. No. 6,489,611 to B. D. Aumond and K. Youcef-Toumi the inventors teach AFM for profiling high aspect ratio samples. They also describe a deconvolution technique for deconvolving the sample image and a technique for measuring the tip radius of curvature. U.S. Pat. No. 6,650,423 to R. J. Markle et al. teaches application of scatterometry techniques, such as reflectometry or ellipsometry, to a method for determining dimensions in a test structure that has a number of trenches and columns defined in the trenches. U.S. Pat. No. 6,602,723 to R. J. Markle presents a method of incorporating metrology grating into die design. J. H. Hussey et al. explain a method and apparatus for run-to-run control of trench profiles in U.S. Pat. No. 6,728,591. According to their teaching, a trench metrology data from the processed wafer is acquired. Then a chamber characteristic adjustment process is performed in response to the trench metrology data and the data relating to the processing chamber characteristic. A feedback adjustment of the processing chamber is performed in response to the chamber characteristic adjustment process. Furthermore, P. A. Burke in U.S. Pat. No. 6,000,281 discloses an integrated stylus with AFM to carry out quick, non-destructive, inexpensive measurements of critical dimensions (CDs).

Although the above references teach many useful approaches to metrology, they cannot be used to construct an efficient, low-cost and fast metrology tool that is primarily non-destructive. To provide a more rapid and versatile metrology system, S. G. Muckenhirm suggests in his U.S. Pat. No. 6,986,280 that AFM/SEM be integrated with a scatterometer. The scatterometer can rapidly measure to indicate whether a problem exists, and the AFM can perform detailed measurements on wafers flagged by the scatterometer. Furthermore, in U.S. published applications 2005/0128489 and 2006/0064280 Bao et al. and Vuong et al. teach an optical metrology model that optimizes the method based on the goals. Additional references include U.S. published application 2004/0080757 to Stanke et al. and U.S. Pat. No. 6,658,922 to Leigh et al.

Of the various AFM/SEM and related measurements employing a scanning probe many are described in the prior art. For further references specific to various techniques related to AFM in particular the reader is referred to the following U.S. Pat. Nos.: 5,017,007; 5,994,691; 6,052,238; 6,194,711; 6,441,359; 6,621,079; 6,643,012; 6,668,628; 6,850,323 and 7,032,427.

Many of the more recent teachings listed above and referenced therein suggest that a combination of techniques would be beneficial for rapid and efficient sample metrology. Unfortunately, none of the teachings solve the problem of an effective and fast combination of optical and scanning probe measurements to yield an efficient, low-cost and fast metrology system.

OBJECTS AND ADVANTAGES

In view of the above, it is an object of the present invention to provide an apparatus and method for integrated metrology employing both optical and scanning probe measurements for obtaining material properties efficiently, rapidly and over a relatively large area. Specifically, it is an object of the invention to obtain parameters of microscopic features of a sample averaged over relatively large area using a micro tool that performs rapid optical measurements, and a nano-tool that performs slow but site specific nanometer scale measurements.

It is another object of the invention to provide a method for integrated metrology that can be employed with a wide variety of samples, material parameters and types of microscopic features.

These and other advantages and objects of the invention will become apparent from the ensuing description.

SUMMARY OF THE INVENTION

The objects and advantages of the invention are secured by an apparatus for integrated measurement of a sample that has miniature features. The apparatus has an optical measuring unit for illuminating the sample with a global test radiation over an optical test region and obtaining an optical response from the optical test region. The response can include scattered or reflected radiation, transmitted radiation or both. In addition, the apparatus has a local measuring unit for measuring a local material parameter $\rho$ of the sample with a scanning probe tip at a test location chosen at an appropriate place within the optical test region. The material parameter $\rho$ is chosen to be substantially constant or uniform over the illuminated area, i.e., it provides information that can be treated as an averaged value over the optical test region. A computational unit determines a property of the miniature features within the optical test region from the optical response supplemented with an adjustment derived from the local material parameter $\rho$ obtained by the local measuring unit.

Various types of local measuring units can be employed in the apparatus of invention. In some embodiments, the local measuring unit is a local mechanical unit that deforms the sample with the scanning probe tip at the test location. In these cases the material parameter $\rho$ is the stiffness, hardness or elastic modulus of the sample and the local mechanical unit is a mechanical indenter for mechanically deforming the sample at the test location by engaging it with the scanning probe tip. The scanning probe tip is a hard tip made of a sufficiently hard material such as diamond, tungsten, carbide or nitride.

In other embodiments, the local measuring unit is a local optical unit for performing a nanometer range optical measurement at the test location with the aid of the scanning probe tip. For example, the scanning probe tip is made of or includes a waveguide and the local optical unit has a source that delivers a local test radiation to the test location via the scanning probe tip. The response can either be detected by the side of the probe (scattered radiation) or through the waveguide (back-scattered radiation). Alternatively, the local test radiation can be delivered from the side and impinge on the scanning probe tip prior to being coupled into the sample. In still other embodiments, the local test radiation can be delivered directly to the sample by other means and then coupled into the scanning probe tip. In most of these embodiments, the evanescent field is employed for coupling because of the nanometer range of the local measurement. Thus, the scanning probe tip may further include a structure, e.g., a solid immersion lens, for evanescent coupling of the local test radiation.

In still other embodiments, the local measuring unit is a local magnetic measurement unit designed to perform a nanometer range magnetic force measurement at the test location with the aid of the scanning probe tip. In these embodiments the scanning probe tip is provided with a magnetically susceptible coating, such as a ferroelectric materials.

In different embodiments still, the local measuring unit is a local electric measurement unit for performing nanometer range electric force measurement at the test location with the aid of the scanning probe tip. These embodiments require that the probe tip be electrically susceptible by being made of or coated with an appropriate material.

In accordance with scanning force measurement techniques, the local measuring unit has a drive for oscillating the scanning probe tip. The drive can be lateral for oscillating the tip laterally or vertical for oscillating the tip vertically, depending on the specific nanometer application. For example, deep structural profile or optical properties determination may require lateral vibration while determination of shallow topographic or mechanical properties may require vertical vibration of the scanning probe tip.

In most embodiments the apparatus also has a scanning unit for scanning the probe tip within or over the optical test region. According to the method of invention, the scan can be performed in a line pattern or in a two-dimensional pattern.

The optical measuring unit and the local measuring unit are preferably mounted at an offset with respect to each other. A mounting arrangement can be provided to achieve this. In some embodiments the offset is virtually zero or very small, such that the optical measuring unit and the local measuring unit can each perform their measurement at the same test location within the optical test region.

The optical measuring unit typically has a broadband source, unless the measurements to be performed include fluorescence or other optical measurements requiring that the material of the sample be stimulated only at one or a few specific wavelengths. When using a broadband source the test radiation is a global test radiation spanning a broadband. The broadband source can be compound, i.e., it can be made up of two or more sources that cover or span different ranges of the broadband.

The method of invention for integrated measurement of the sample with miniature features is practiced by illuminating the sample with the global test radiation over the optical test region. The global test radiation can be broadband or narrow band, depending on the type of measurement being performed. The method further calls for obtaining an optical response from the optical test region to the global test radiation and selecting a local material parameter $\rho$ exhibiting substantial uniformity over the optical test region. The local material parameter $\rho$ thus chosen is measured with the scanning probe tip at a test location within the optical test region. A property of the miniature features within the optical test region is then determined from the optical response as supplemented by the adjustment, e.g., a selection criterion or identifier, a correction factor or the like derived from the local material parameter $\rho$. For example, when using a broadband global test radiation the optical response can include a family of response graphs over the entire bandwidth and the adjustment derived from the local material parameter $\rho$ can be an identifier for selecting a particular response graph from the family. In general, the board band global test radiation can span any sub-band of electromagnetic radiation between x-rays and deep infrared. When employing the techniques of scatterometry, the broadband typically extends from ultraviolet to near infrared.

The measurement of the local material parameter $\rho$ can involve a mechanical, optical, magnetic, electrical or other physical measurement employing the scanning probe tip. In case of mechanical measurements it is convenient to use measurements that mechanically deform the sample at the test location to produce a local deformation that is elastic, inelastic or viscoelastic. Specifically, the movement of the scanning probe tip can produce transient or permanent indentations, punctures or scratches to produce such local deformation and make the local measurement.

Whether the step of measuring the local material parameter $\rho$ involves a mechanical, optical, magnetic, electric or other physical measurement, it is performed in the nanometer range and employs the scanning probe tip. In other words, the measurement affects only a small fraction of the optical test region that is examined by the global test radiation. The local material parameter $\rho$ can be measured at one or more alternative test location within the optical region and averaged to ensure that the value used in computations is indeed substantially uniform over the optical test region.

The apparatus for integrated measurement in accordance with the invention typically uses one or more detectors for obtaining the optical response from the optical test region. For example, one detector is used to measure scattered or reflected radiation and one detector is used to measure transmitted radiation. Typically the optical test region will be at least 10 micrometers square of the surface of the sample. Of course, if substantial uniformity of the material parameter $\rho$ extends over a larger area, then the optical test region size can be increased. Meanwhile, the test location is usually at most a few micrometers square in scan size, but measuring properties with nanometer resolution laterally.

The apparatus and method of invention are applicable when the sample is an optical disc, a magnetic disc, an integrated electronic circuit on a wafer, an opto-electronic circuit an optical grating or any other suitable sample. Many alternative embodiments of both the method and apparatus are possible. A detailed description of the preferred embodiments of the invention is presented below in reference to the appended drawing figures.

DETAILED DESCRIPTION

Figure 1:
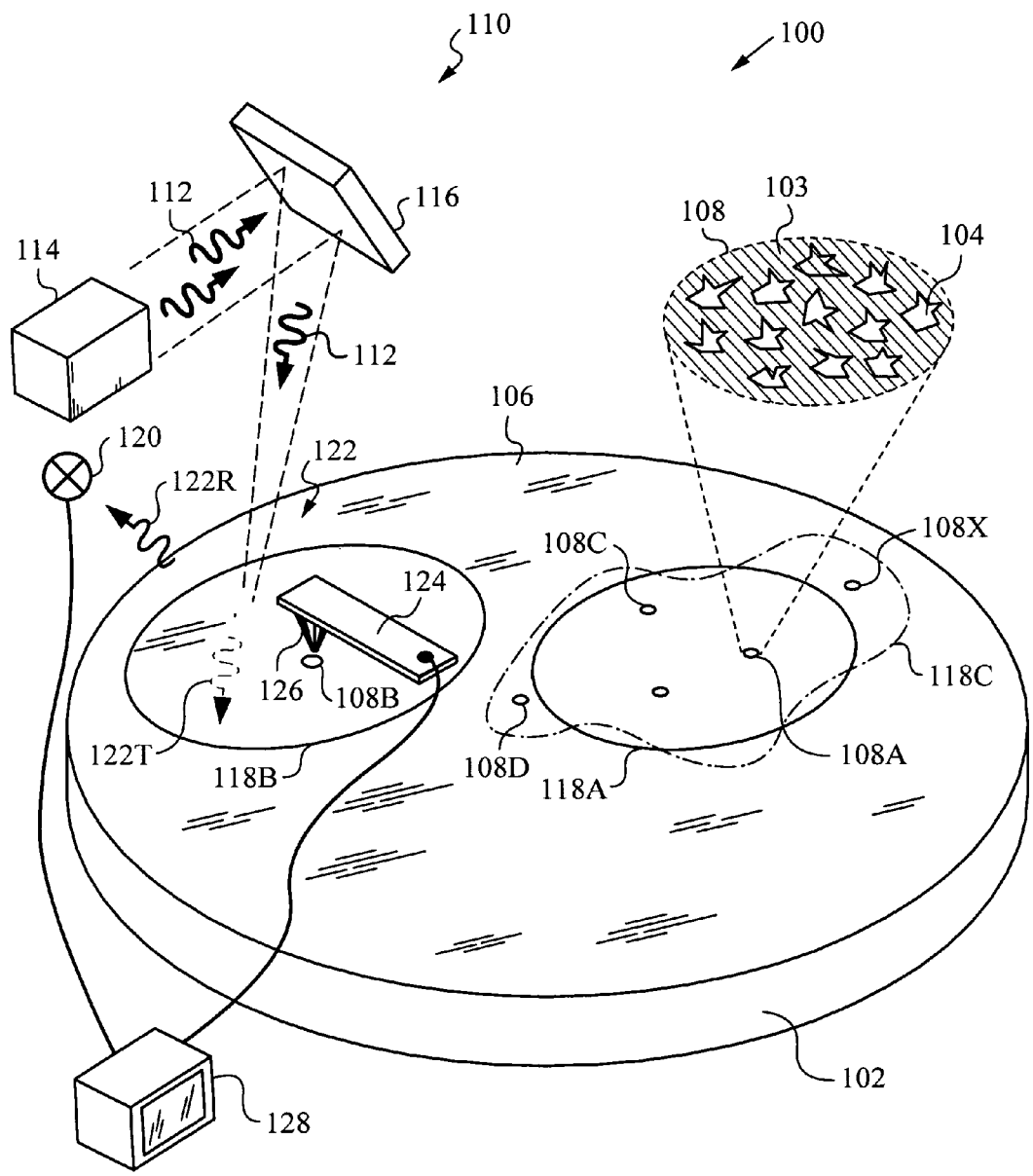
FIG. 1 is a simplified three-dimensional schematic diagram illustrating the basic principles of the apparatus and method of the instant invention.

The present invention will be best understood by first reviewing the basic principles based on the simplified three-dimensional schematic diagram of FIG. 1. The diagram shows the salient aspects of an apparatus 100, in accordance with the invention, for performing an integrated measurement of a sample 102 that has miniature features 104. In general, sample 102 can be made of any type of material 103 and it can have an arbitrary geometry, as long as it can be examined with both electromagnetic radiation and a scanning probe tip. Consequently, sample 102 can be made of optical materials, magnetic materials, insulators, conductors, semiconductors and any other suitable inorganic and/or organic materials. Miniature features 104 can be any geometrical or material composition variations borne on any surface of sample 102, embedded in sample 102 or forming a part of sample 102, i.e., bulk properties. In the present example, sample 102 is a semiconductor wafer and miniature features 104 are lithographically produced structures etched on a top surface 106 of wafer 102, as made visible in an enlarged view of a nano-sized region 108A of wafer 106. Region 108A may be on the order of a few hundred square nanometers and, for the purposes of present invention, any region or measurement covering such order of magnitude or smaller will be referred to as nano-scale or nanometer range.

Apparatus 100 has an optical measuring unit 110 for illuminating sample 102 with a global test radiation 112. Unit 110 has a source 114 for generating radiation 112 and optics 116 for shaping and directing radiation 112 at wafer 102. More precisely, optics 116 are used for illuminating wafer 102 over an optical test region 118B. Test region 118B is macro-sized or macro-scale, meaning that it is on the order of at least 1 square millimeter and usually on the order of a few square millimeters. In fact, if the properties chosen for integrated measurement are highly uniform across wafer 102, as explained below, then entire surface 106 of wafer 102 could form a single test region 118B. In the present case, however, the properties chosen are not sufficiently uniform over entire wafer 102 and thus a number of test regions are selected within which the properties can be considered substantially uniform such that an averaging operation can be performed. For reasons of clarity, only two of these test regions, namely test regions 118A and 118B are shown in FIG. 1.

Optical measuring unit 110 is further equipped with a detector 120 for examining an optical response 122 to global test radiation 112 produced by wafer 102 in optical test region 118B. In general, optical response 122 of wafer 102 can include scattered or reflected radiation 122R, or transmitted radiation 122T or both. To measure transmitted radiation 122T a detector (not shown) has to be provided below wafer 102, as will be readily appreciated by those skilled in the art.

Apparatus 110 has a local measuring unit 124 for measuring a local material parameter $\rho$ of sample 102. In accordance with the integrated measurement approach of the invention, unit 124 has a scanning probe tip 126 for measuring local material parameter $\rho$ at a specific location chosen within optical test region 118B. In fact, in the example shown the measurement performed by tip 126 is a nanometer range measurement performed at a nano-sized test location 108B within region 118B. In selecting parameter $\rho$ it is important that it be suitably chosen for test region 118B. Specifically, local material parameter $\rho$ should be one that optical unit 110 can take to be substantially constant or uniform over illuminated macro-sized optical test region 118B. In general, parameter $\rho$ can represent any local mechanical property, optical property, electric property or magnetic property that can be measured with scanning probe tip 126. Specific choices of parameter $\rho$ may require additional adaptations to tip 126 to perform the corresponding nano-scale measurement. These adaptations and will be discussed in the below embodiments.

In the selection of local material parameter $\rho$ it is possible to first measure it at a number of nano-sized test locations 108C, 108D, . . . 108X within a proposed optical test region 118C. The final shape and size of region 118C can then be determined based on averaging the obtained values of local material parameter $\rho$. For example, an acceptable value spread or an average material parameter $\rho_{avg}$ can be specified for any given embodiment and then used to delimit the final size and shape of optical test regions 118.

Apparatus 100 has a computational unit 128 that is connected to both optical unit 110 and local measuring unit 124. Unit 128 is used to determine a property of miniature features 104 within optical test region 118B from optical response 122 supplemented with an adjustment derived from local material parameter $\rho$ obtained by local measuring unit 124. Preferably, unit 128 is a computer equipped with a processor that can be used for determining a property of features 104 as well as determining average material parameter $\rho_{avg}$ and the break-up of wafer 102 into test regions 118.

Apparatus 100 of the invention is well-suited for examining desired properties of features 104 fast because of the intrinsic speed of optical examination by macro-scale tool or optical unit 110. These properties, however, are averaged over relatively large areas or test regions 118. On the other hand, the site-specific nano-scale measuring tool or local measuring unit 124 is slow. In a production environment, optical unit 110 can be used to measure macro-scale or even micro-scale changes rapidly across entire wafer 102. Meanwhile, local unit 124 that measures on nano-scale is slow, but is excellent for monitoring detailed variation of material parameter ρ locally for occasional use, as may be necessary. For example, local unit 124 can be used to investigate abnormalities detected by macro-scale measurements by unit 110 or to provide some initial critical dimensions (CDs) that assist in removing ambiguity that may be inherent in macro-scale analysis such as profile determination of features 104. This may be of particular importance when features 104 are trenches or contact holes.

Figure 2:
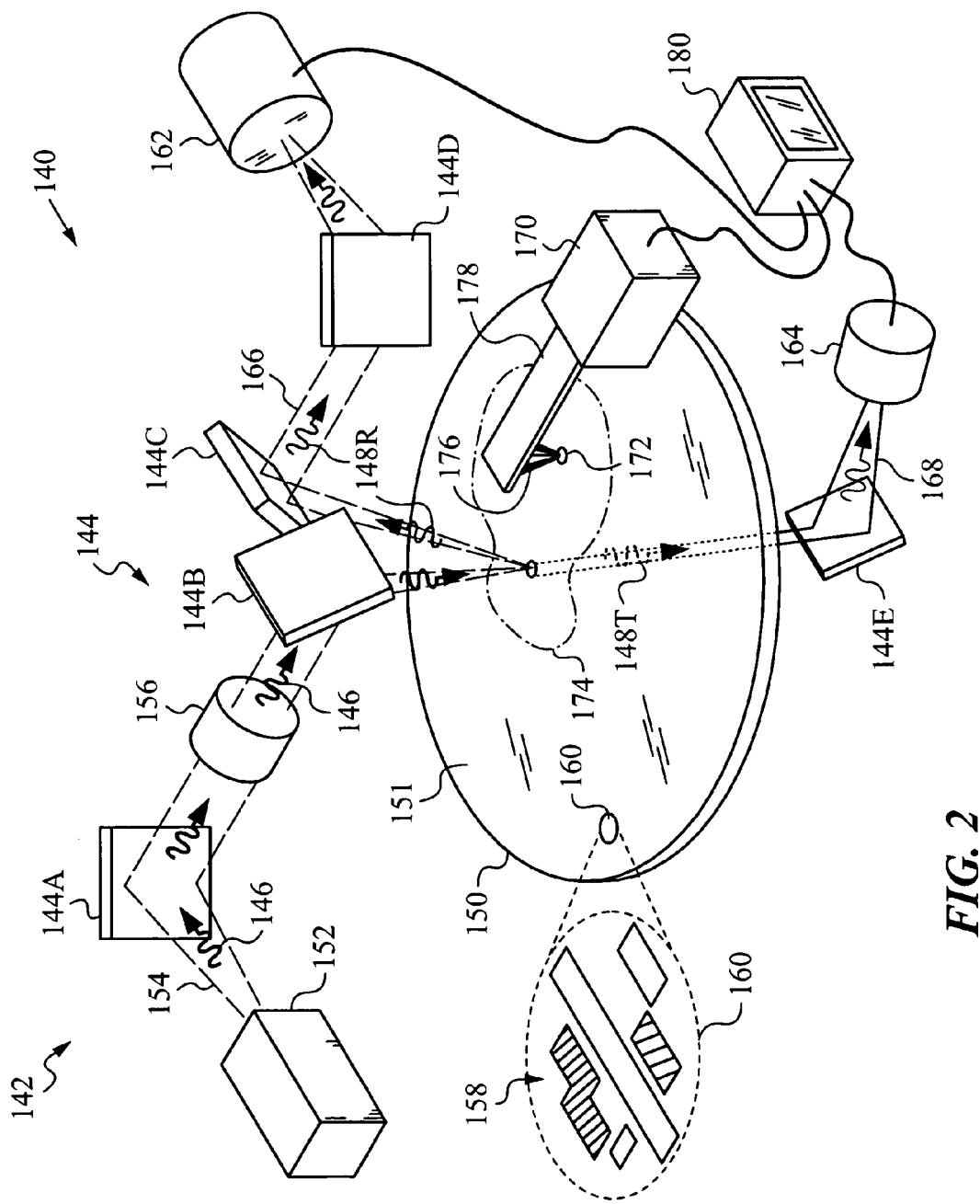
FIG. 2 is a three-dimensional diagram illustrating a simplified exemplary apparatus according to the invention.

FIG. 2 shows in more detail a three-dimensional simplified view of an apparatus 140 with an optical unit 142 that employs all reflective optics 144 such that a broadband global test radiation 146 can be advantageously employed for performing macro-scale measurements. Although in some embodiments the invention can be employed with narrow band global test radiation, in which case refractive optics can be used, it will be appreciated by those skilled in the art that broadband radiation 146 would suffer significant chromatic aberrations when employed in a refractive system. To avoid these chromatic aberrations and attendant beam steering and focusing problems, optical unit 142 employs reflective optics 144 to deliver radiation 146 and to collect optical response 148R and 148T from a sample 150.

In particular, reflective optics 144 include mirrors 144A, 144B for shaping broadband test radiation 146 issuing from a broadband source 152 into a test beam 154. An optional polarization control unit 156 is used in the path of beam 154 to control polarization, as may be desired in case of ellipsometric measurements or other polarization-sensitive measurements. Mirrors 144A, 144B may have any suitable curvature to accomplish the required collimating, shaping and focusing functions. For example, they can be parabolic, toroidal or other curved mirrors not limited in number to the two shown.

In the present embodiment, sample 150 is a semiconductor wafer processed by photolithography and etching to produce miniature features 158 on its top surface 151, as shown in the enlarged view of a small region 160. Features 158 correspond to electronic circuitry and traces that are to be examined prior to dicing wafer 150 into individual integrated circuits (ICs).

Optical unit 142 is designed to measure two types of optical response produced by wafer 150, namely scattered or reflected radiation 148R and transmitted radiation 148T. Reflective optics 144 are equipped with mirrors 144C and 144D for collecting, shaping and guiding reflected radiation 148R in the form of a reflected beam 166 to a first spectrometer or detector 162. A separate mirror 144E is positioned below wafer 150 for collecting, shaping and guiding transmitted radiation 148T in the form of a transmitted beam 168 to a second spectrometer or detector 164. Once again, any mirrors with suitable curvature to accomplish the required collimating, shaping and focusing functions may be used. For example, mirrors 144C, 144D and 144E can be parabolic, toroidal or other curved mirrors not limited in number to the two shown. It should be noted that additional optical elements including spatial filters, plane reflectors, refractive elements, wavefront correction elements and other optics appreciated by those skilled in the art can be used by optical unit 142 to treat reflected radiation 148R and transmitted radiation 148T as required to make the intended macro-scale measurement.

Apparatus 140 has a local measuring unit 170 for performing nano-scale local measurements of a material parameter ρ at a test location 172 within an optical test region 174. Optical test region 174 is selected such that parameter ρ can be taken to be substantially constant for the purposes of integrated measurement over entire region 174. Note that parameter ρ can be measured at several test locations within optical test region 174 first to derive an average value $\rho_{avg}$ to be used in the integrated measurement.

Unit 170 has a scanning probe tip 176 mounted on a well-known cantilever structure 178. Probe tip 176 is designed for the particular material parameter ρ that is to be measured during the nanometer range measurement at test location 172. Of course, different specific types of local measuring unit 170 will be used as well, depending on the choice of material parameter ρ.

A computation unit 180 is connected to first and second detectors 162, 164 and to local measuring unit 170. In the present embodiment, unit 180 is a computer programmed for determining a property of miniature features 158 within optical test region 174. For example, unit 180 is programmed to use information obtained from reflected and transmitted radiation 148R, 148T at each point within optical test region 174 to obtain a family of spectral curves or response graphs. Such families of response graphs are well-known in the art and typically include plots of reflectivity, transmittance, real and imaginary portions of the index of refraction, namely n and k, as well as phase information as a function of wavelength.

It is also well known that families of response graphs are typically under-constrained when using information obtained from reflected and transmitted radiation 148R, 148T only. This is particularly true when features 158 are periodic or of such nature that several graphs in the family could represent the solution. In these situations, knowledge of material parameter ρ that is substantially uniform over test region 174 can be used to derive an adjustment. More precisely, in the embodiments where families of response graphs present degenerate solutions, the adjustment derived from local parameter ρ can be used as an identifier for selecting a specific graph from the family of response graphs. All of the associated computations are preferably performed by unit 180.

Figure 3:
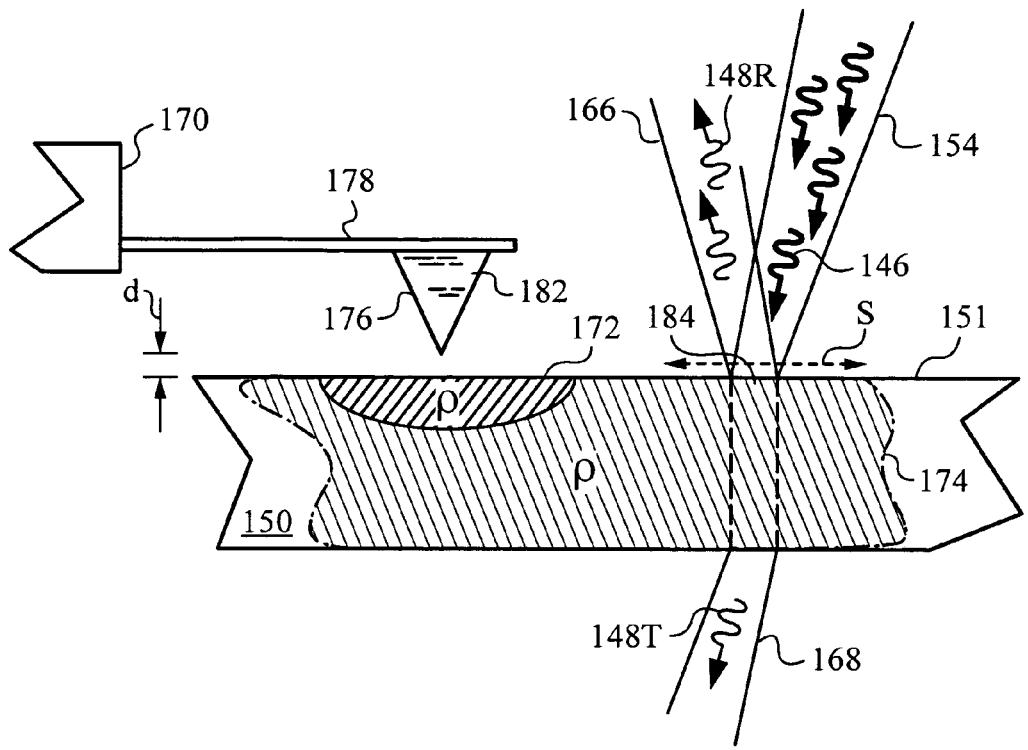
FIG. 3 is a cross-sectional side view illustrating the measurement of a local material parameter with scanning probe tip and illumination of an optical test region with global test radiation.

The apparatus and method of invention can be implemented with various specific types of local measuring units. FIG. 3 illustrates in a more detailed and cross-sectional view a portion of unit 170 during measurement of local material parameter ρ with scanning probe tip 176 at test location 172. Miniature features 158 are not explicitly shown in this figure for reasons of clarity. Note that parameter ρ is substantially uniform throughout test region 174. In this embodiment, unit 170 is a mechanical unit that deforms wafer 150 at test location 172 and the local material parameter ρ is stiffness of wafer 150. More precisely, then, unit 170 is a mechanical indenter and tip 176 is a hard tip made of an appropriately hard mechanical material 182 such as diamond, carbide or nitride. This is done in order to extend the life of and prevent mechanical damage to tip 176 and at the same time simplify the analysis.

Figure 4:
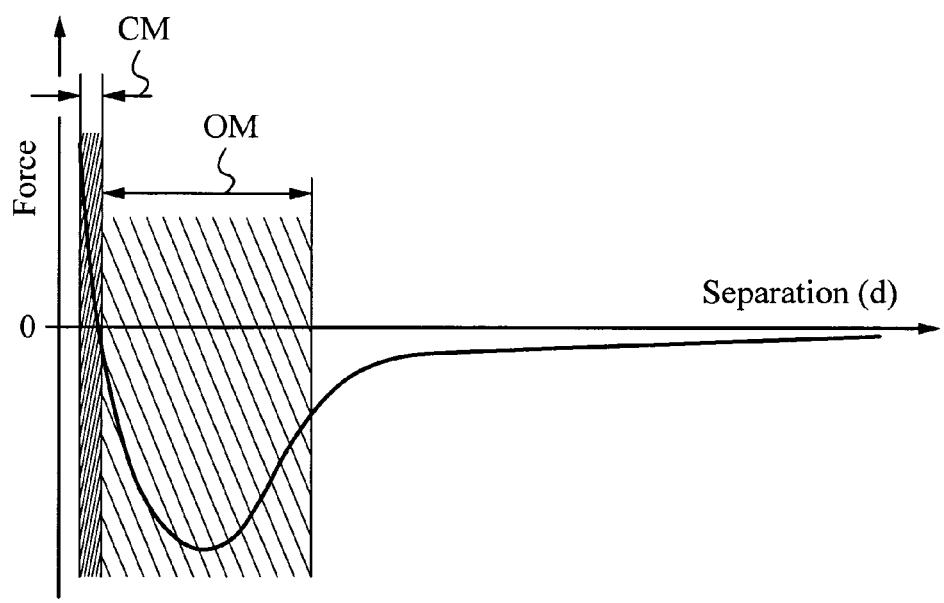
FIG. 4 is a graph illustrating the operation region of the scanning probe tip.

Now, to better understand the operation of unit 170 it is useful to review the force between tip 176 and wafer 150 as a function of separation or distance d between the two. The corresponding graph is shown in FIG. 4. At large distances d the force between tip 176 and wafer 150 is slightly negative, i.e., it is attractive. In a region OM where tip 176 can be employed in a non-contact oscillating mode OM the attractive force increases up to a maximum attractive force. At closer distances d the force becomes repulsive as tip 176 comes closer and establishes contact with wafer 150. When operating in a contact mode CM tip 176 is in sufficient mechanical engagement with surface 151 of wafer 150 to produce deformation. During mechanical measurements performed with tip 176 it is possible to mechanically deform wafer 150 at test location 172 to produce a local deformation that is elastic, inelastic or viscoelastic. Specifically, the down and up movement of scanning probe tip 176 can produce transient or permanent indentations, punctures or scratches as necessary to make the local measurement of the selected material parameter ρ. The specifics of the actual measurement process are well understood by a person skilled in the art and will not be discussed in detail herein.

Referring back to FIG. 3, the local measurement of stiffness ρ at test location 172 provides knowledge of ρ over entire test region 174 that is then examined optically with global test radiation 146. In the present embodiment, the macro-scale measurement with test radiation 146 is performed by focusing it in a beam 154 to a micro-scale point 184 and scanning point 184 over region 174 as indicated by arrow S. Even though scanning only examines region 174 one point at a time, it can examine entire region 174 very quickly by employing, e.g., a raster scan. Alternatively, it may also examine a few select points rather than entire region 174. As is well known, scanning probe tip 176 is not capable of such rapid scanning and is therefore advantageously employed for nanometer range local measurement of stiffness ρ at just one or at most a few test locations 172.

Figure 5:
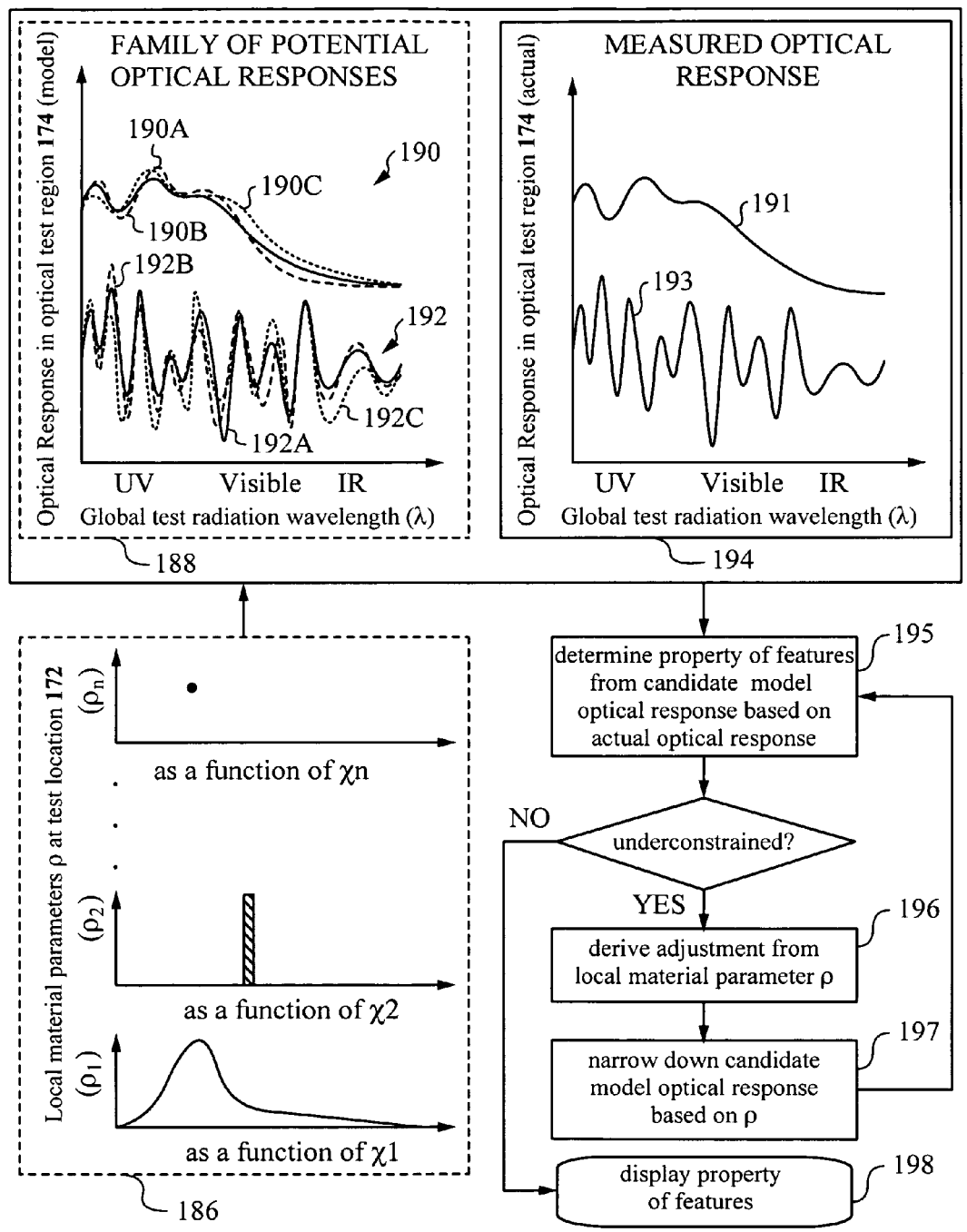
FIG. 5 is a modified schematic flow diagram illustrating an exemplary implementation of the method of the invention.

The schematic flow diagram of FIG. 5 illustrates in a general manner how the method of invention can be practiced with apparatus 140. Starting from lower left quadrant, in a first step 186 a number of local material parameters $\rho_1, \rho_2, \ldots, \rho_n$ are measured with local measurement unit 170. In general, parameters $\rho_1, \rho_2, \ldots, \rho_n$ may all be different and/or they may be measured at the same or at different test locations 172. In the present example, parameters are different but are all measured at test location 172. The values of parameters $\rho_1, \rho_2, \ldots, \rho_n$ are expressed in terms of the appropriate physical quantities, expressed in general as $\chi 1, \chi 2, \ldots, \chi n$. From these parameters $\rho_1, \rho_2, \ldots, \rho_n$ the ones that are most uniform over optical test region 174 are chosen.

In a second step 188 a family of potential optical responses of sample 150 within optical test region 174 over the bandwidth of global test radiation 146 is determined. In this case the optical responses include a family of reflectance graphs 190 and a family of phase graphs 192. As is known in the art, potential optical responses as represented by graphs 190, 192 contain in them information about miniature features 158 of sample 150. It should be noted that other optical responses such as wavelength-dependent values of the complex index of refraction (n and k) or polarization can be used. Families of reflectance graphs 190 and phase 192 are sometimes derived from models of sample 150 and/or calibration information from a test sample or standard. A person skilled in the art of scatterometry will appreciate that there exist many modeling approaches to obtaining such families of graphs.

In a third step 194 the actual or measured optical response composed of reflected and transmitted radiation 148R, 148T is obtained. The information from radiation 148R, 148T is used to obtain a measured reflectance graph 191 and a measured phase graph 193.

In a fourth step 195, a property of features 158 in optical test region 174 is determined based on the best candidates from among the potential optical responses as shown by graphs 190, 192 and measured optical responses from graphs 191, 193. Typically, however, the property of features 158 cannot be uniquely determined based on just graphs 190, 192 and 191, 193 because of insufficient information. In other words, without additional information, the derivation of properties of features 158 is an underconstrained problem.

Now, in accordance with the invention, when the problem is underconstrained, an adjustment is derived based on the measured value of local material parameter ρ in a fifth step 196. Supplemented by this additional constraint the choice of candidate model graphs 190, 192 is narrowed down in a sixth step 197. Step 195 is then repeated. The narrowing down of candidate model graphs 190, 192 can be performed in an iterative manner, as shown, by adding adjustments based on one single parameter ρ at a time. Alternatively, the iteration can be replaced in one step of applying all measured parameters $\rho_1, \rho_2, \ldots, \rho_n$ at the same time to constrain the problem. In performing this step the best or most uniform among parameters $\rho_1, \rho_2, \ldots, \rho_n$ can be used first or be correspondingly weighted to optimize the output.

Once parameter ρ or parameters $\rho_1, \rho_2, \ldots, \rho_n$ constrain the problem, the final property of features 158 is determined and displayed in step 198. It should be noted that any property of the miniature features 158 within optical test region 174 can be determined on the basis of optical response supplemented by the adjustment derived from local material parameter ρ or multiple such parameters $\rho_1, \rho_2, \ldots, \rho_n$. Technically, in terms of the mathematical application, parameter ρ can be used as a selection criterion, identifier, a correction factor or the like.

Figure 6:
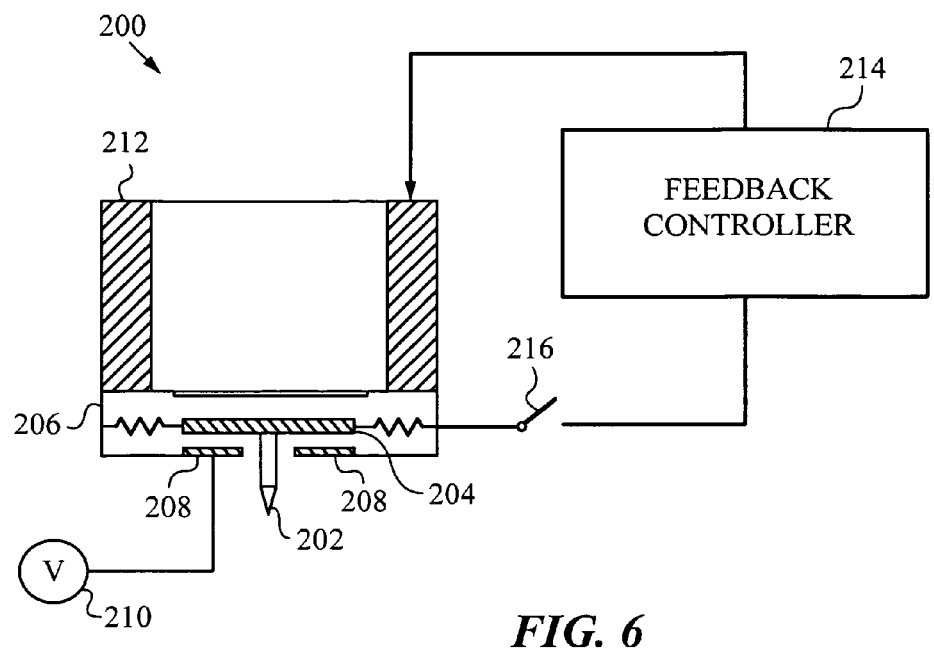
FIG. 6 is a cross-sectional side view of a local mechanical unit in the form of a mechanical indenter.

FIG. 6 is a cross-sectional side view of another local mechanical unit 200 specifically designed to function as a dynamic stiffness mapping (DSM) tool or DSM-indenter for measuring stiffness ρ. Unit 200 has a hard scanning probe tip 202 preferably made of diamond. Tip 202 is mounted on a support plate 204 of a displacement transducer 206, rather than on a cantilever. Transducer 206 has an electrode 208 and a voltage source 210 for applying a varying a potential V to electrode 208. The potential or voltage V can be sinusoidal such as $V=V_o \sin(\omega t)$, where ω is an angular velocity. Sinusoidal voltage will cause support plate 204 to undergo oscillatory motion as it is attracted and repulsed from electrode 208 at angular velocity ω. The displacement into the material can be expressed as $x=x_o \sin(\omega t+\delta)$. The magnitude of the displacement x provides information about the stiffness ρ of the sample material, while δ relates to its viscoelasticity.

A piezo-tube 212 with a feedback controller 214 is mounted above transducer 206 to help in mapping the surface of the sample based on the displacement of tip 202. Specifically, the displacement of tip 202 is obtained from the spring constant of plate 204 of transducer 206. Feedback controller 214 is connected to transducer 206 by switch 216 and thus can obtain the value of the spring constant directly from transducer 206. In the contact mode mapping is performed while piezo-tube 212 and feedback controller 214 keep the force constant during the scan. In making nanometer scale measurements in the contact mode such as scratch or indentation testing switch 216 is turned off and therefore feedback controller 214 is not used.

Figure 7:
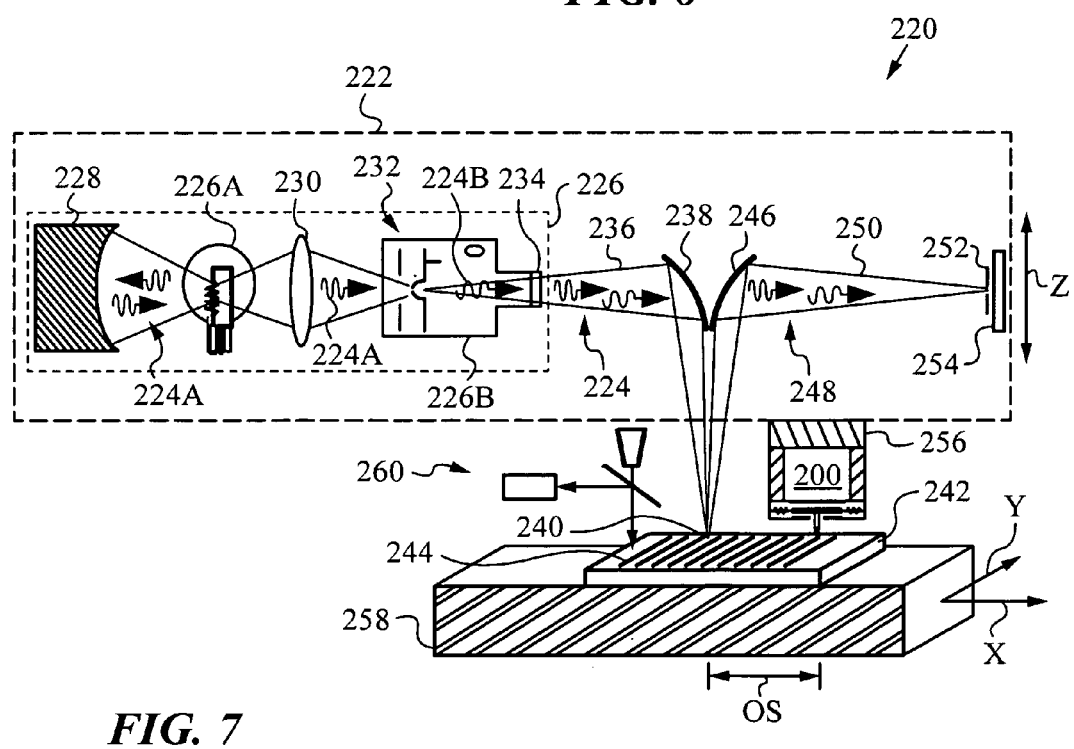
FIG. 7 is a cross-sectional side view of an apparatus employing the mechanical indenter of FIG. 6.

FIG. 7 illustrates in cross-sectional side view an exemplary embodiment of an apparatus 220 using an optical measuring unit 222 that generates broadband global test radiation 224 from a broadband source 226 and also employs indenter 200 of FIG. 6. Broadband source 226 has two sources 226A and 226B spanning different ranges of the broadband emission spectrum. In particular, source 226A is a halogen or tungsten lamp emitting test radiation 224A in a sub-band spanning the visible portion of the electromagnetic spectrum. Source 226B is an ultra-violet lamp emitting test radiation 224B in an ultra-violet sub-band of the electromagnetic spectrum.

Radiation 224A and 224B is combined with the aid of a back reflector 228, a lens 230, an entrance aperture 232 and an all-pass output window 234 belonging to UV lamp 226B. In addition to combining radiation 224A and 224B, these optical elements also guide radiation 224 to form a common test beam 236. A person skilled in the art will appreciate that many alternatives exist for combining radiation 224A, 224B or even more separate sub-bands of radiation to form broadband sources. In general, broadband source 226 can use two or more sources that span any sub-band of electromagnetic radiation between x-rays and far infrared. The combining optics may include both reflective and refractive elements without any limitation. A few of the many exemplary broadband source arrangements can be found in U.S. application Ser. No. 11/264,733 entitled "System and Method for High Intensity Small Spot Metrology filed on 31 Oct. 2005 to the present assignee.

Optical measurement unit 222 uses a first toroidal mirror 238 to focus test beam 236 of broadband global test radiation 224 to a micro-scale point 240 on a sample 242. Sample 242 is an optical element whose microscopic features 244 are parallel grooves forming a diffraction grating. Unit 222 has a second toroidal mirror 246 for collecting scattered or reflected radiation 248 returning from sample 242. Note that scattered radiation 248 is the only optical response measured in the present embodiment (no transmittance measurement). Toroidal mirrors 238, 246 are in fact arranged such that scattered radiation 248 is intercepted and shaped into a response beam 250. Response beam 250 is focused to pass a pinhole filter 252 and is delivered to a detector 254 for measurement. A person skilled in the art will recognize that optical measurement unit 222 is a very effective scatterometer, especially when operating at near-normal incidence.

Apparatus 220 has a mounting arrangement 256 for holding optical measuring unit 222 and local measuring unit, namely indenter 200 at an offset OS with respect to each other. Offset OS is specifically defined between spot or point 240 and tip 202 of indenter 200. Although mounting arrangement 256 is shown only schematically, it will be understood by a person skilled in the art that it may include fixtures and relative stages. In particular, it may be in communication with a Z-stage (not explicitly shown) that allows the operator to move unit 222 up and down as indicated by the arrow Z. Furthermore, sample 242 is mounted on an X-Y stage 258 that can move along the X- and Y-axes as shown. Mounting arrangement 256 could also be in communication with X-Y stage 258. It is preferable that offset OS be sufficiently small to ensure that local nanometer range measurement of material parameter ρ can be performed sufficiently close to point 240 to stay within the smallest possible test region. In other words, offset OS should not be larger than the size of the smallest contemplated test region.

An aligner 260 using a standard light source, a beam splitter and a detector is provided to position sample 242 on X-Y stage 258. Many possible ways of positioning and indexing samples on work stages are known in the art, and any one of those can be employed in the present invention.

Apparatus 220 can be employed to practice the method of invention in various cases where the material parameter ρ is selected to be the stiffness of sample 242. Preferably, indenter 200 is used to measure ρ at a location that is away from microscopic features 240 in order not to leave permanent scratches or indentations. Alternatively, indenter 200 can measure stiffness ρ in a mode where no permanent marks are left. The ability to perform such non-destructive measurements depends on the type of material and its viscoelastic and elastic properties, as will be appreciated by those skilled in the art. Meanwhile, the scatterometric measurements performed by unit 222 can include any suitable measurements, including, e.g., polarization-sensitive measurements. Of course, additional optical components may be required to perform these measurements, as is known in the art.

Figure 8:
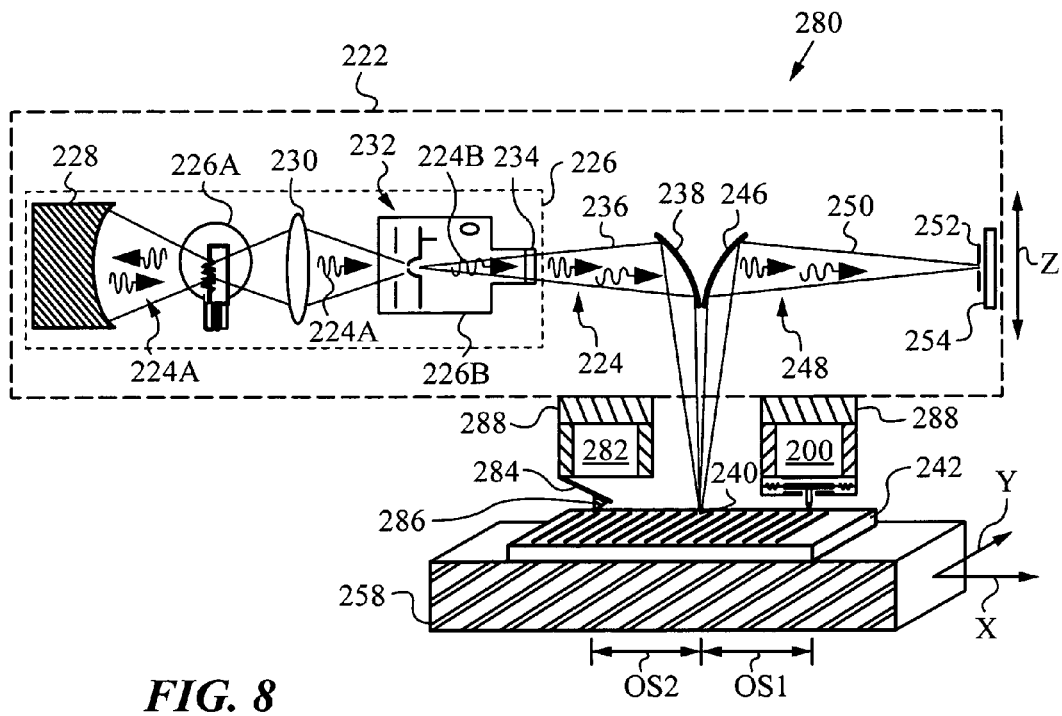
FIG. 8 is a cross-sectional side view of still another apparatus employing the mechanical indenter of FIG. 6 and a scanning probe microscope (SPM).

FIG. 8 shows in a cross-sectional side view still another apparatus 280 employing mechanical indenter 200 of FIG. 6 in conjunction with optical measuring unit 222 of FIG. 7. For reasons of convenience, the same reference numerals are used to denote corresponding parts. In addition to mechanical DSM indenter 200, apparatus 280 is equipped with a local mechanical scanning probe unit 282 for making nanometer scale measurements of a material parameter ρ. Unit 282 has a cantilever 284 bearing a scanning probe tip 286 for measuring parameter ρ. In the present embodiment, unit 282 is a scanning probe microscope (SPM) that measures material parameter ρ in a non-contact or contact mode.

A mounting arrangement 288 is provided for holding both DSM indenter 200 and SPM 282 at offsets OS1 and OS2 to illuminated point or spot 240, respectively. The criteria for selecting the size of offsets OS1 and OS2 are preferably the same as above, i.e., neither offset is larger than the largest contemplated test region within which material parameter ρ is substantially constant or uniform.

The advantage of apparatus 280 is that it can measure material parameter ρ with both DSM indenter 200 and SPM 282. These measurements can be performed simultaneously or at different times. Alternatively, DSM indenter 200 can be employed to measure a first material parameter $\rho_1$, such as stiffness or friction coefficient, while SPM can measure a second material parameter $\rho_2$ such as surface roughness, critical dimension (CD) or other profile or topology parameters. Thus, if the family of response graphs obtained by optical unit 222 is severely under-constrained, i.e., there are many possible response graphs that could represent the correct answer, then both parameters $\rho_1$ and $\rho_2$ can be used in deriving the adjustment or selection criterion. In other words, the unit (not show in this figure) determining a property of miniature features 244 from optical response 248 can derive an adjustment from both parameters $\rho_1$ and $\rho_2$ to select the correct response graph.

Figure 9:
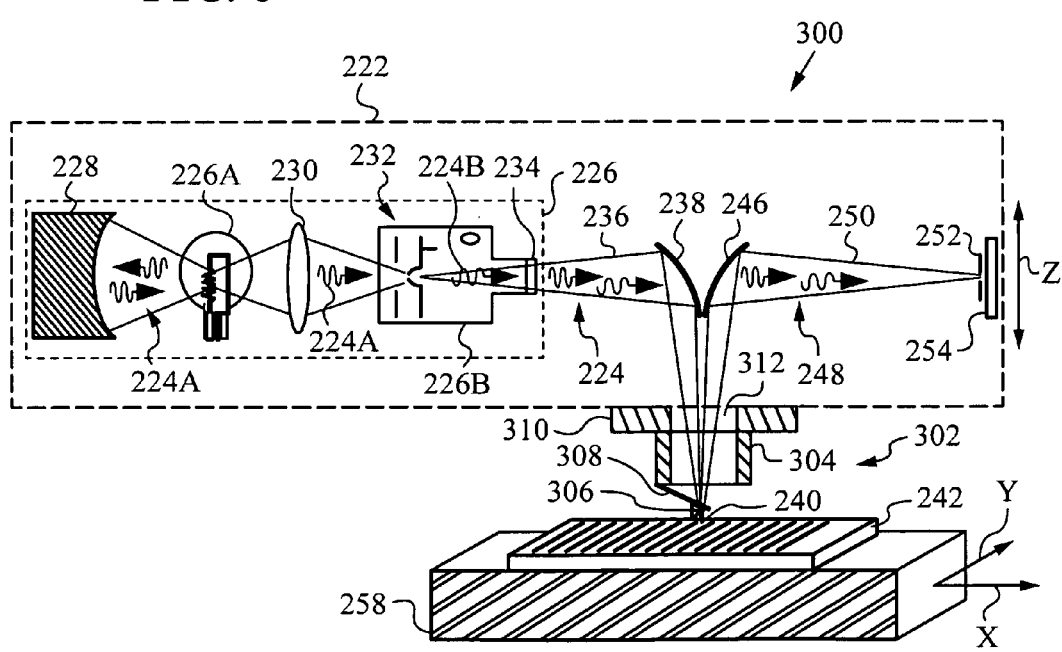
FIG. 9 is a cross-sectional side view of another apparatus employing an SPM.

FIG. 9 is a cross-sectional side view of an apparatus 300 employing an SPM 302 in conjunction with optical unit 222. Once again, the same reference numerals are used to denote corresponding parts. SPM 302 has a piezo-tube 304 for controlling scanning probe tip 306 mounted on a cantilever 308. In this embodiment, SPM 302 is operated in the oscillating mode OM since, unlike the indenter, it is not made to operate in the contact mode CM (see graph in FIG. 4).

A mounting arrangement 310 with a central passage 312 holds SPM 302 such that test beam 236 can pass through it and the unobstructed center of piezo-tube 304. In fact, passage 312 is large enough and the angle of incidence is selected sufficiently close to normal in this embodiment, that response beam 250 can be collected by mirror 246. By virtue of this type of mounting arrangement 310 the offset between spot 240 of optical measuring unit 222 and local measuring unit 302, i.e., the SPM can be very small or even virtually zero. This can be achieved by adjusting the focal point of test beam 236 to be lower in elevation than tip 306 of SPM 302. At the same time, tip 306 is located at the middle of spot 240 laterally. Thus, SPM 302 can make nanometer scale measurements of local material parameter ρ such as surface roughness or a topological parameter while global test radiation 224 is being used to make macro-scale optical measurement. The location of interest is specified by optical system 222 that is indexed with respect to local point 240 and SPM tip 306.

The above embodiment can be extended for other types of local measuring units besides SPM 302. In an analogous arrangement, not shown, SPM 302 could be an atomic force microscope (AFM) with a piezo-tube. Once again, the broadband global test radiation of the scatterometer passes through the AFM piezo-tube. The focal point of global test radiation is lower in elevation than the AFM tip, but the tip is located at the middle of the spot of scatterometer radiation laterally. Typically the AFM can perform while the light is on. For scatterometry, the whole optics and AFM are elevated to get the light at the focal point on the sample. If another local measuring unit such as a DSM/indenter were to be employed, its tip should be located off the path of global test radiation. The location to be examined is specified by the optical system that is indexed with respect to local point of the scatterometer and DSM/indenter/AFM tips.

The combination of optical measuring unit employing global test radiation and local measuring unit measuring a nanometer scale material parameter $\rho$ can be employed in a variety of other configurations. Specifically, local measuring unit can be a local optical unit for performing a nanometer range optical measurement at the test location with the aid of the scanning probe tip.

Figure 10A:
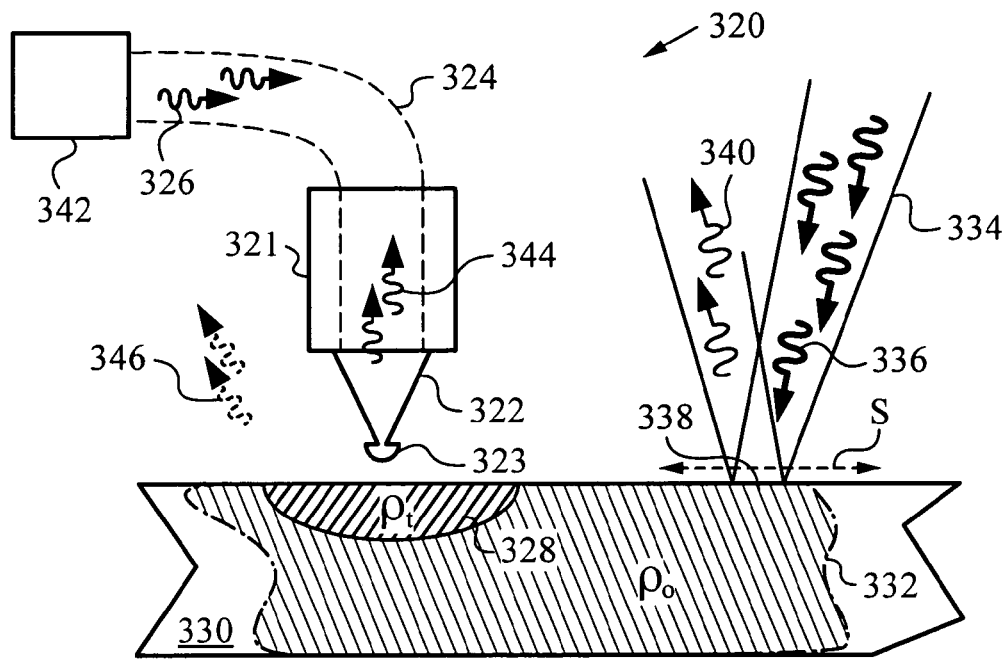
FIGS. 10A-C are partial schematic side views of local optical units with various scanning probe tips for performing a nanometer range optical measurement at the test location.

FIG. 10A illustrates a portion of a local optical unit 320 that uses a microscope-type device 321 with a scanning probe tip 322. Tip 322 includes a waveguide 324 made of a suitable optical material for delivering a local test radiation 326 to a test location 328 of a sample 330. Test location 328 is nanometer scale and is located within a test region 332 that is macro-scale in comparison with test location 328.

Tip 322 may simply be the tip of a tapered optical fiber, as is well known in the field of near-field optical microscopy. In the present embodiment, however, tip 322 terminates in a structure 323 for evanescent coupling of said local test radiation into sample 330. There are many appropriate structures or lensing mechanisms, including solid immersion lenses for improved near-field coupling of local test radiation 326 into and out of sample 330 at test location 328. It will be appreciated by those skilled in the art that other solutions from the field of near-field scanning optical microscopy (NSOM) such as the use of nano-apertures and appropriate oscillation of tip 322 both laterally and vertically can be adapted in this embodiment.

Test region 332 is studied by illuminating it with a test beam 334 of a global test radiation 336 at a point or spot 338. Spot 338 may be scanned over the surface of sample 330 as indicated by arrow S. An optical response in the form of reflected radiation 340 is intercepted to determine a property of microscopic features (not explicitly shown) of sample 330.

A remote source 342 generates local test radiation 326 at a suitable wavelength and amplitude to conduct the nanometer range optical measurement of a material parameter $\rho$ at test location 328. This measurement may involve any NSOM technique. For example, the measurement can be a fluorescence measurement to determine a material parameter $\rho$ indicative of the material composition of sample 330. Either back-scattered test radiation 344 returning via waveguide 324 or scattered test radiation 346 propagating away from tip 322 can be used in the measurement. When using back-scattered radiation 346, a detector for detecting it can be integrated with source 342. When using back-scattered radiation 346, appropriate optics have to be provided for collecting radiation 346 and a detector for detecting it (not shown).

The use of NSOM 321 enables the user to perform nanometer range optical measurements at test location 328 that are not possible with a mechanical local measuring unit. For example, NSOM 321 can study additional optical properties of sample 330 to supplement the information from optical response 340. Source 342 can be designed to produce local test radiation 326 at a set of wavelengths to perform local spectroscopic analysis of sample 330 at test location 328. In these cases the material parameter $\rho$ can be a material composition. NSOM can also provide valuable local optical properties such as luminescence and can be used to perform local RAMAN spectroscopy for obtaining vibrational modes and possibly the degree of crystallinity of the material. It is important, however, to make sure that whatever material parameter $\rho$ or parameters is/are ultimately chosen be uniform or essentially constant over test region 332 for the purposes of determining any of the properties of microscopic features. In the worst case, $\rho_t$ at test location 328 and $\rho_o$ in the most dissimilar portion of test region 332 should be sufficiently close as to not substantially affect the adjustment derived from $\rho$.

Figure 10B:
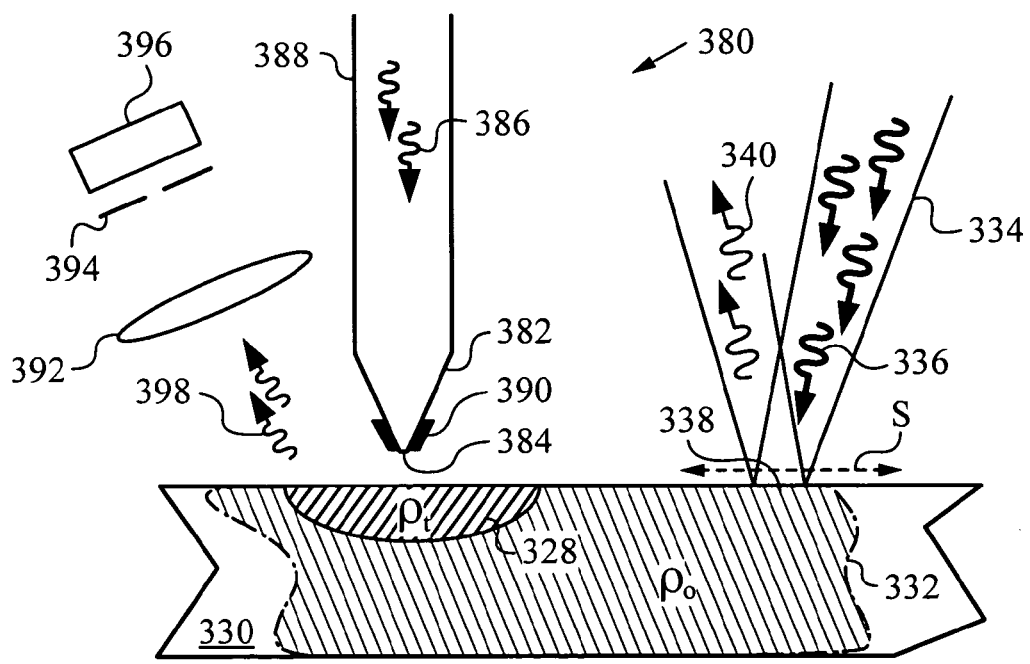

FIG. 10B illustrates another local optical unit 380 used to perform nanometer range optical measurements at test location 328 of sample 330. The same reference numerals as in FIG. 10A are used to denote corresponding parts. Unit 380 has a scanning probe tip 382 that tapers down to an out-coupling facet 384 that has a width less than a wavelength of local test radiation 386 used by unit 380. Tip 382 is made from a tapered optical fiber 388. It has a metallic aperture 390 around out-coupling facet 384 to facilitate out-coupling of local test radiation 386 and for oscillating tip 382 laterally during operation. The corresponding electronics are not shown, but are well known to those skilled in the art.

Unit 380 has an optic 392, a pinhole 394 and a detector 396, e.g., a photo-multiplier type detector set up to intercept a scattered portion 398 of local test radiation 386. The advantage of this arrangement is the generally higher signal to noise ratio, since in-coupling back-scattered radiation in near-field operation is difficult.

During operation, test radiation 386 is coupled into sample 330 at test location 328 to perform the nanometer range optical measurement. Scattered portion 398 is captured by optic 392 and delivered to detector 396 for measurement. A computation unit (not shown) determines a material parameter pt in test location 328 based on the measurement.

As in the previous embodiment, unit 380 can also provide valuable local optical properties such as luminescence and can be used to perform local RAMAN spectroscopy for obtaining vibrational modes and possibly the degree of crystallinity of the material. Once again, it is very important to make sure that material parameter $\rho$ be essentially constant over test region 332 for the purposes of determining any of the properties of microscopic features (not shown). In the worst case, $\rho_t$ at test location 328 and $\rho_o$ in the most dissimilar portion of test region 332 should be sufficiently close as to not substantially affect the adjustment derived from $\rho$.

Figure 10C:
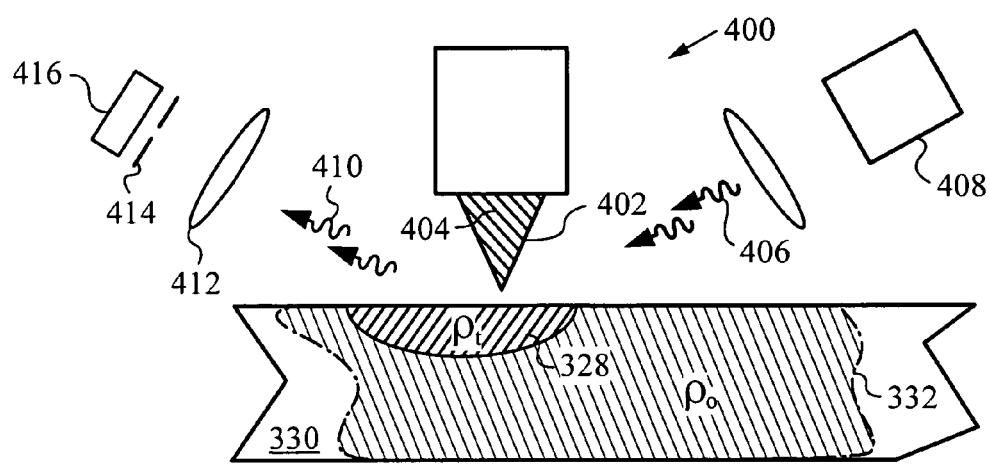

FIG. 10C illustrates yet another local optical unit 400 used to perform nanometer range optical measurements at test location 328 of sample 330. The same reference numerals as in FIG. 10A are used to denote corresponding parts. Unit 400 has a scanning probe tip 402 that is made of a reflective material 404. The purpose of tip 402 is to aid in coupling a local test radiation 406 delivered from a source 408 located on one side of tip 402. Specifically, local test radiation 406 is aimed such that it impinges on scanning probe tip 402 and is in-coupled into sample 330. Since tip 402 is not a waveguide, scattered radiation 410 is collected with the aid of optic 412, pinhole 414 and detector 416 located on the other side from source 408. As in the above embodiments, unit 400 is used for performing nanometer range measurements of a material parameter $\rho_r$ in test location 328. Parameter $\rho$ should be essentially constant over test region 332 for the purposes of determining any of the properties of microscopic features (not shown).

Still other embodiments of local optical units employing local test radiation that can be delivered directly or indirectly to the sample are possible. Various means for in-coupling with the aid of a scanning probe tip are known in the art and can be employed in these embodiments. In most of them, the phenomenon of evanescent field coupling is employed because of the intrinsic nanometer range of the local measurement in this coupling regime. However, because it is important that the material parameter $\rho$ be substantially uniform over the selected test region, it is advantageous to first try several material parameters $\rho_1, \rho_2, \ldots, \rho_n$ and sample them at many test locations before determining the final test regions.

Figure 11A:
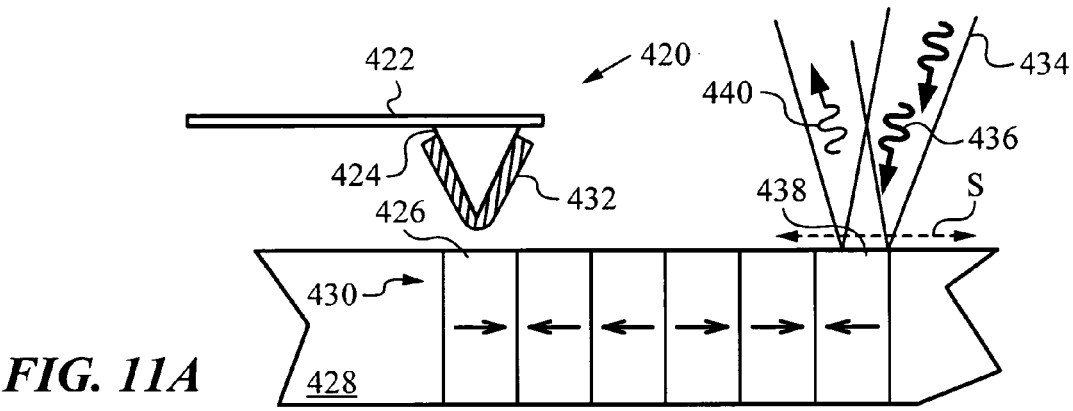
FIGS. 11A-B are cross-sectional side views of various magnetic media configurations (longitudinal (LMR) and perpendicular (PMR)) using scanning probe tips for performing a nanometer range magnetic force measurement at the test location.

FIG. 11A shows still another local measuring unit 420 that is a local magnetic measurement unit 420. Unit 420 has a cantilever 422 and a scanning probe tip 424 for performing nanometer range magnetic force measurements at a test location 426 in a sample 428. In these embodiments sample 428 can be a magnetic storage disk with corresponding magnetic domains 430. Domains 430 are longitudinally magnetized domains that encode bits of data and represent microscopic features whose properties are to be determined by an integrated measurement in accordance with the invention.

Tip 424 of unit 420 is provided with a magnetically susceptible coating 432 such that it responds to magnetic forces generated by changing magnetic fields. Specifically, coating 432 is made of a ferroelectric material. Therefore, as tip 424 is scanned over sample 428 it registers opposite forces corresponding to oppositely magnetized or aligned domains 430. In other words, tip 424 can "read" the data encoded in domains 430.

An optical measurement unit (not shown) provides a test beam 434 of broadband global test radiation 436 to a microscale point 438 on disk 428. A scattered radiation 440 is the only optical response measured in the present embodiment (no transmittance measurement). To perform a global scatterometric measurement, point 438 is scanned over the surface of disk 428.

At this point, one should recall that scatterometry relies on reflectance of incident light that is an inherent function of the film thickness (d) and optical constants (index of refractions (n) and extinction coefficients (k)), energy band gap ($E_g$) and interface roughness (a) of the film as well as substrate. The optical constants are functions of photon energy and can be expressed by Forouhi and Bloomer (FB) physical-based dispersion equations (1, 2):

$$k(E) = \sum_{i=1}^{q} \frac{A_i(E - E_{gi})^2}{E^2 - B_i E + C_i} \quad (1)$$

$$n(E) = n(\infty) + \sum_{i=1}^{q} \frac{B_{oi}E + C_{0i}}{E^2 - B_i E + C_i} \quad (2)$$

Parameters $B_{0i}$ and $C_{0i}$ are dependent on $A_i$, $B_i$, $C_i$, and $E_g$. The equation (2) is derived from (1) through Kramer-Kronig dispersion equation. For amorphous materials k exhibits one peak with energy requiring integer q being unity. In polycrystalline materials k(E) may show multiple peaks and therefore require q>1. To obtain the parameters, the broadband experimental reflectance is compared to a model with either known ("fixed") optical constants available from the literature or use FB dispersion equations 1 and 2 to get the parameters by a minimization routine represented by a goodness of fit (GOF).

$$GOF = 1 - \sqrt{\frac{1}{N}\sum_{i=1}^{N} [R_{\exp}(E_i) - R_{cal}(E_i)]^2} \quad (3)$$

For multilayer films such as longitudinal magnetic medium of disk 428 the optical constants of layers are determined by building up layer by layer on the substrate (not shown) and preserving their values for the consequent build up layer. This allows fixing optical constants of all but the top layer, and therefore reducing adjustable parameters.

The nanometer range measurement by unit 420 of material parameter $\rho$ with tip 424 can be employed to further reduce the number of adjustable parameters. For example, tip 424 can measure material parameter $\rho$ such as average size of magnetic domains 430 or their average magnetization within test location 426. Knowledge of local material parameter $\rho$ over a large optical test region, which may include entire disk 428, will then constrain the number of possible response graphs obtained from the scatterometric measurement performed with global test radiation 436.

Figure 11B:
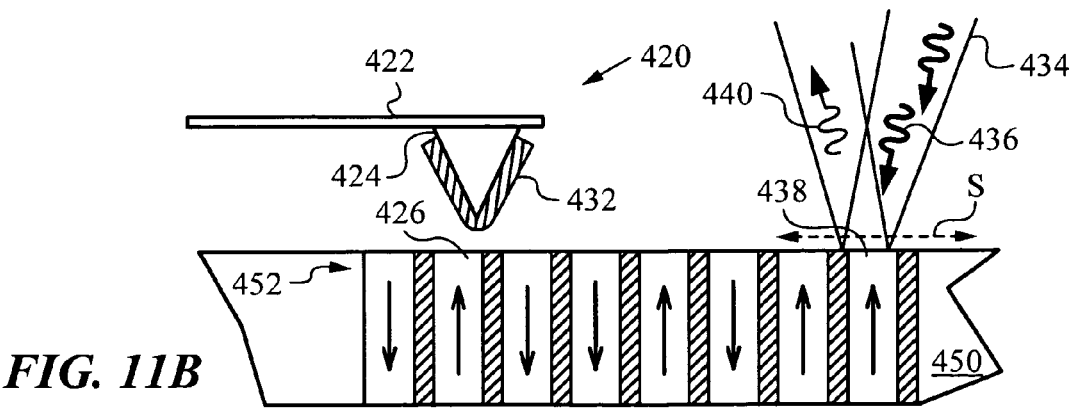

FIG. 11B illustrates unit 420 employed in the same manner for performing an analogous nanometer range magnetic force measurement of a material parameter $\rho$ in a magnetic storage disk 450 with perpendicularly magnetized domains 452. The same reference numerals as in FIG. 11A are used to designate corresponding parts.

It should be noted that the reflectance of longitudinal versus perpendicular media samples differs. Both samples contain soft under layer, magnetic media and overlayer coating. The reflectance of perpendicular media is lower by about 10% in comparison with longitudinal media in the wavelength between 300 to 700 nm. At lower wavelength the deviation gradually diminishes toward UV while at the higher wavelength becomes more pronounced approaching IR. Note that FIG. 11A shows near top magnetic media film with longitudinal grain configuration. This is different from perpendicular magnetic grain shown in FIG. 11B. In either case, the grain size and orientation and encapsulating materials can be imaged by magnetic force microscopic technique. The optical technique may be used to obtain the ratio of the magnetic grains with respect to encapsulating amorphous materials.

Figure 12A:
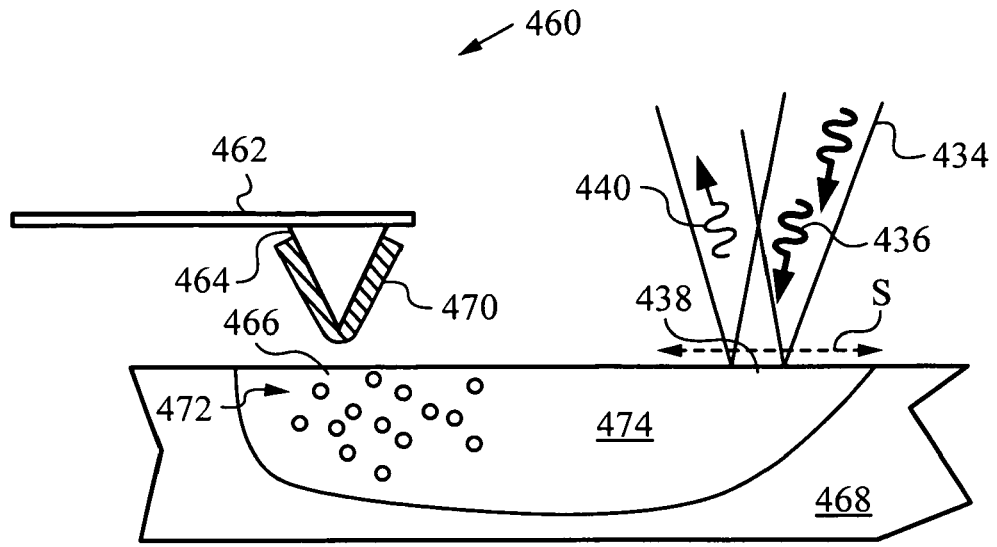
FIGS. 12A-B are cross-sectional side views of two different scanning probe tips for performing a nanometer range electric force measurement at the test location.

Still other embodiments of an apparatus according to the invention take advantage of local measuring units that make nanometer range electric force measurements. For example, FIG. 12A shows in cross-section the side view of a local measuring unit 460 that has a cantilever 462 with a scanning probe tip 464 for performing nanometer range electric force measurements at a test location 466 in a sample 468. In this embodiment sample 468 can be a conductor or semiconductor.

Tip 464 of unit 460 is provided with an electrically susceptible coating 470, i.e., a conductive coating such that it responds to electric force due to net or moving charge in sample 468 by producing a current or a voltage differential. Therefore, as tip 464 is scanned over sample 468 it registers electrical forces. In the present example, the forces are due to the movement of charges 472. Because of this susceptibility, unit 460 can measure material parameter $\rho$ such as charge mobility at test location 466. In accordance with the invention, parameter $\rho$ is selected such that it is substantially constant or uniform over an optical test region 474 of sample 468. Thus, knowledge of parameter $\rho$ is used in the integrated measurement together with response radiation 440 obtained in the scatterometric measurement.

Figure 12B:
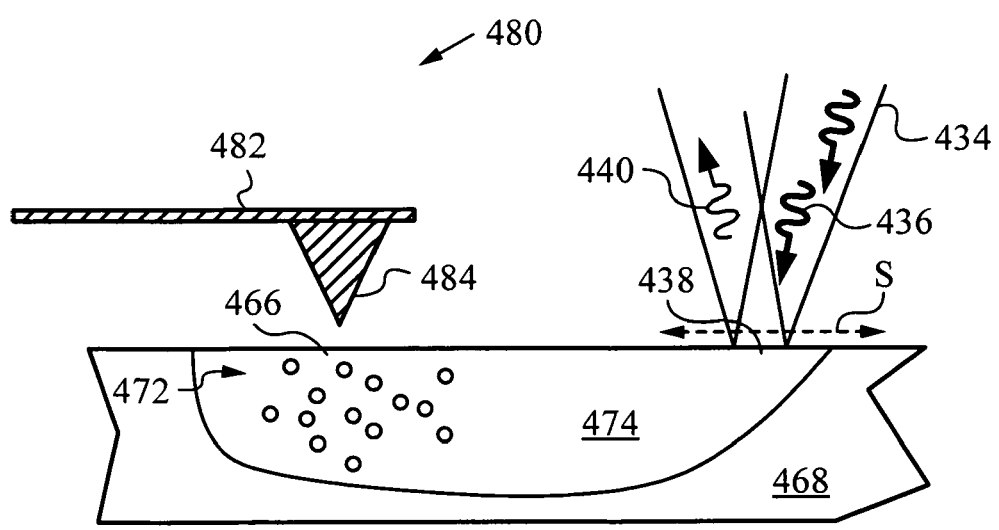

FIG. 12B shows in cross-section the side view of a local measuring unit 480 that has a cantilever 482 with a scanning probe tip 484 for performing nanometer range electric force measurements at test location 466 in sample 468. In this embodiment parts corresponding to those in FIG. 12A are denoted by the same reference numerals.

Tip 484 of unit 480 and cantilever 482 are made of a conductor. Thus, tip 484 responds directly to an electric force due to net or moving charge in sample 468 by producing a current or a voltage differential that is carried to appropriate circuitry via cantilever 482. As tip 484 is scanned over sample 468 it registers electrical forces such as those due to the movement of charges 472. Because of this susceptibility, unit 480 can measure material parameter ρ such as charge mobility at test location 466 and can be employed in a manner similar to unit 460 of FIG. 12A.

In any of the above embodiments, the underlying nanometer range measurement technique typically relies on scanning or oscillating the scanning probe tip while measuring material parameter ρ. For this reason, the local measuring unit has a drive for oscillating the tip. This drive could be in the form of a piezo-tube or a suitable transducer, as shown and discussed above, or some other electrostatic, electromagnetic or mechanical drive mechanism. Depending on the precise material parameter ρ being measured, the tip is oscillated laterally, e.g., to measure charge mobility, or vertically, e.g., to measure a surface topology parameter of some shallow topographic or mechanical parameter. A lateral drive is used for oscillating the scanning probe tip laterally and a vertical drive is used for oscillating it vertically. Of course, some mechanisms combine the ability to oscillate the tip either laterally or vertically and may be used as well.

Figure 13:
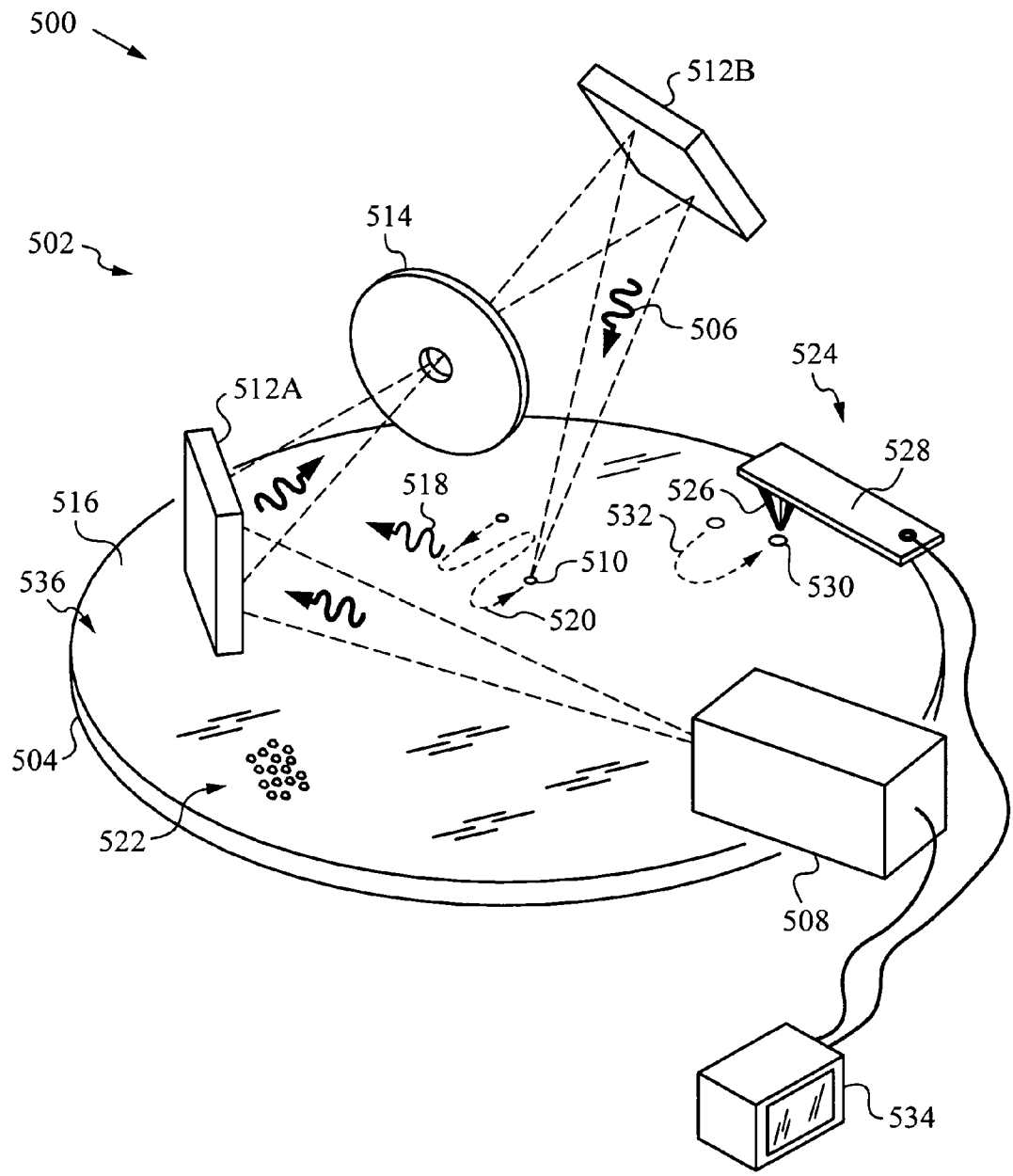
FIG. 13 is a three-dimensional view of another global optical measurement unit employing all-reflective optics.

FIG. 13 illustrates in a partial three-dimensional view another apparatus 500 in accordance with the invention. Apparatus 500 has an optical measuring unit 502 for illuminating a sample 504 with a global test radiation 506. Test radiation 506 is broadband and is generated by a compound broadband source 508. Radiation 506 is delivered to a spot 510 on sample 504 by an all-reflective system of curved mirrors 512A, 512B. To further improve performance and focusing over the broadband range, unit 502 has a spatial filter 514 positioned in the beam path.

In the present embodiment, an optical test region has not yet been selected. Instead, spot 510 is scanned over entire surface 516 along a scan path 520 of sample 504 to obtain an optical response 518 for calibration purposes. The detection optics and electronics for measuring optical response 518 are not shown in this figure for purposes of clarity.

Figure 14:
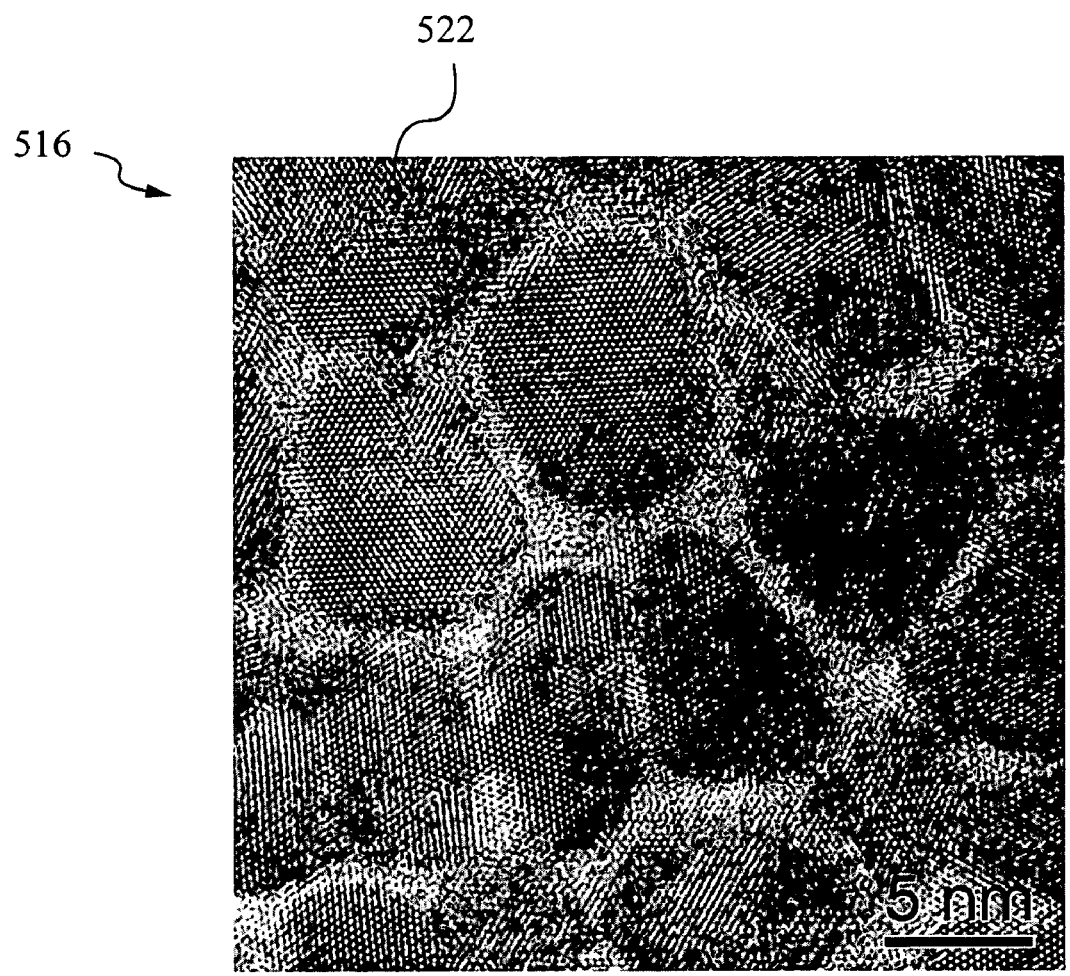
FIG. 14 is a TEM view of the surface of a perpendicular magnetic media with magnetic grains separated by a non-susceptible material (the local parameter here is the average grain size).

Sample 504 is a disk of perpendicular magnetic recording medium and thus miniature features 522 of sample 504 are embedded local magnetic grains. FIG. 14 is a transmission electron microscope (TEM) micrograph of surface 516 that shows these nano-scale Co-based magnetic grains 522 each having a diameter of ≈5 nm and encapsulated by non-susceptible material, in this case $SiO_2$. Typically the $SiO_2$ is in the amorphous phase and the oxide phase constitutes as much as 20% of surface 516 in a typical perpendicular magnetic recording medium.

Referring back to FIG. 13, apparatus 500 has a local measuring unit 524 for measuring a local material parameter ρ of disk 504 with a scanning probe tip 526. Tip 526 is magnetically susceptible and is mounted on a cantilever 528. A lateral drive (not shown) is provided for oscillating tip 526 laterally above a test location 530. Also, a scanning arrangement (not shown) is provided for scanning entire unit 524 so that tip 526 can be displaced along a scan path 532 to examine different test locations 530. Scan path 532 can proceed in a line pattern or some other two-dimensional pattern. Also, various test locations 530 all over surface 516 can be spot tested. In performing these scans or spot tests it is important to ascertain uniformity of material parameter ρ chosen for the integrated measurement of the property of grains 522. A computation unit 534 controls the process of determining the size and shape of an optical test region 536. For this reason, unit 534 is connected to both local measuring unit 524 and optical measuring unit 502.

In the event that entire disk 504 exhibits sufficient uniformity in ρ, then its entire surface 516 is taken as an optical test region 536. In the present case average grain size is chosen as material parameter ρ and it is found to be consistent on the order of ~5 nm encapsulated with 1-2 nm of different amorphous material such as $SiO_2$ over entire disk 504 with deviations sufficiently minor to not affect the integrated measurement. Note that optical beam diameter should be at least an order of magnitude larger than nanometer scale features 522. In general, a threshold can be set for how much deviation in material parameter ρ is tolerated before breaking up disk 504 into separate optical test regions 536.

During operation, optical measuring unit 502 illuminates optical test region 536 of disk 504 with global broadband test radiation 506 extending from the ultra-violet to the infrared. Unit 502 reports optical response 518 over the broadband range to computation unit 534. Meanwhile, after reporting average grain size ρ of disk 516 to computation unit 534 local measuring unit 524 can be kept in stand-by mode. Computation unit 534 determines a property of miniature features 522 within optical test region 536 from optical response 518 with an adjustment derived form grain size p. It should be noted that in some applications of the method of invention, the property of miniature features 522 that is determined by computation unit 534 from the integrated measurement could be directly related to material parameter ρ itself.

Figure 15:
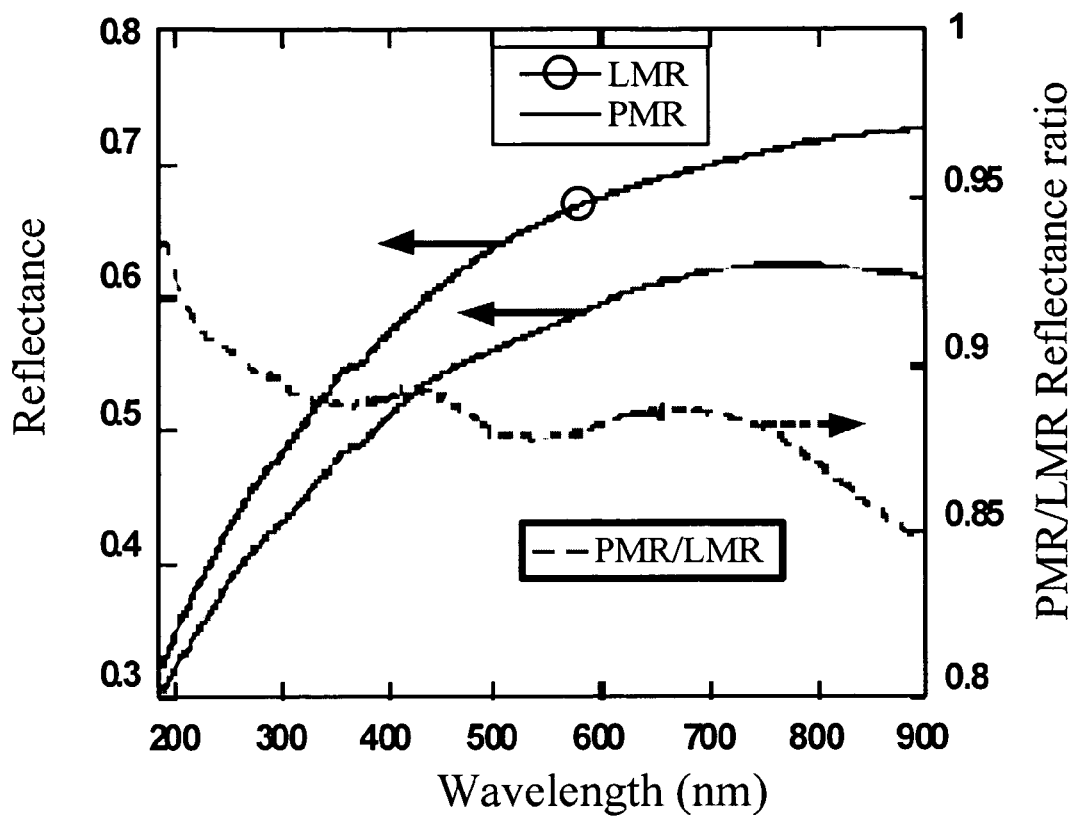
FIG. 15 is a graph of reflectance comparing typical longitudinal (LMR) and perpendicular magnetic media (PMR) samples.
Figure 16:
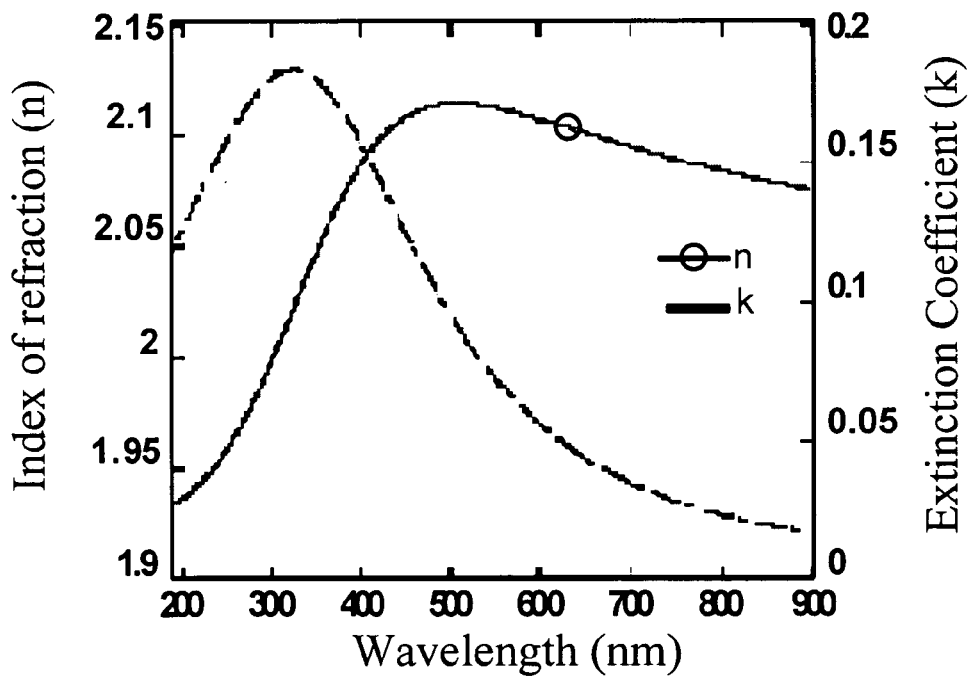
FIG. 16 is a graph illustrating the variation of the index of refraction (n) and extinction coefficient (k) of a carbon overlayer in magnetic media.

For comparison purposes, the method of invention was applied to two disks of magnetic recording material. The first was a typical longitudinal recording medium (LRM) and the second was a perpendicular recording medium (PRM). Both samples have similar interface roughness and material parameter ρ. The graphs in FIG. 15 illustrate their reflectivities. Note that the main factor contributing to lower reflectance in perpendicular media as compared to longitudinal media is due to its texture of the magnetic layer, which consists of columns of the magnetic alloy separated by $SiO_2$ amorphous phase as discussed above (see FIG. 14). Further, the graphs in FIG. 16 illustrate the variation of the index of refraction (n) and extinction coefficient (k) of a carbon overlayer in both PMR and LMR magnetic media measured in accordance with the invention.

The integrated metrology method of the invention can also be applied to measuring samples that have microscopic features such as trenches or contact holes. In this case the local measuring unit preferably is a scanning probe tip for mechanically measuring a critical dimension (CD) of one or more representative contact holes. The CD is then chosen as the material parameter ρ and the optical test region is defined. The optical measuring unit then performs a wide area scatterometric measurement over the optical test region using a wide range of wavelengths. The scatterometric measurement is adjusted by the knowledge of ρ to yield the desired property of the microscopic features, e.g., contact holes.

Figure 17:
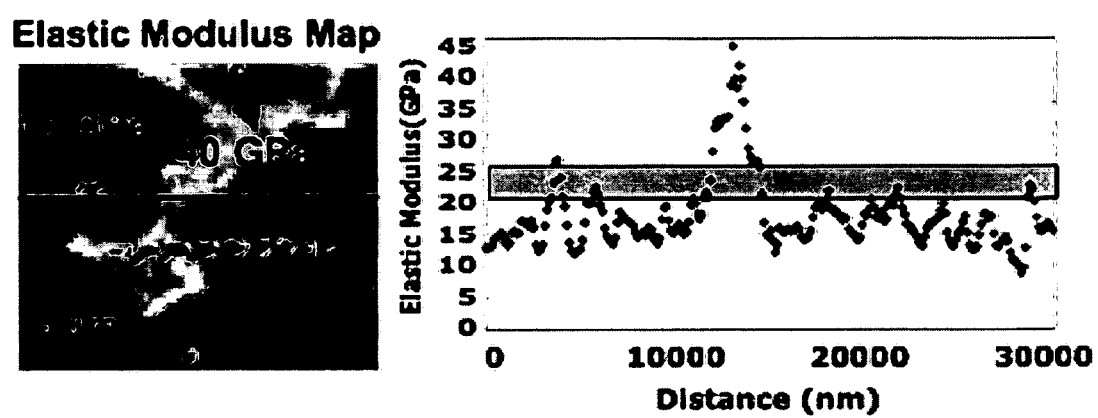
FIG. 17 illustrates nanometer scale mapping of the stiffness of material and indentations produced by a mechanical indenter in a bone sample for nanometer scale hardness determination.

The method and apparatus of invention can be applied in many environments. For example, they can be used in the study of biological samples or samples such as bone. In these cases the local measuring unit is preferably a mechanical indenter and the material parameter is stiffness or elastic modulus. FIG. 17 illustrates a dynamic stiffness map and nanoindentations produced by mechanical indenter in a bone sample (black triangular). The image represents the map of the elastic modulus. The absolute values of elastics modulus are shown along the continuous line on the map. The property of microscopic features of the bone are obtained by measuring the amplitude of the displacement into the material as well as the phase between the displacement and applied force.

In many embodiments the optical measuring unit is a broadband source that is compound, i.e., it is made up of separate sources spanning different ranges of the selected broadband spectrum. In fact, the broadband global test radiation can span any sub-band of electromagnetic radiation between x-rays and deep infrared. When employing scatterometry, the broadband typically extends from ultra-violet to far infrared. However, some of the measurements to be performed may include optical events that happen at specific wavelengths, such as fluorescence. In those embodiments the optical unit may use global test radiation at just the particular wavelength necessary to produce the optical event to be measured. In these embodiments it is not as important to use all-reflective optics and more traditional refractive optics can be employed instead.

Depending on the uniformity of the material parameter $\rho$, the optical test region will be at least 10 micrometers square of the surface of the sample. In cases of high uniformity of $\rho$ it could be much larger. For example, if $\rho$ is substantially uniform over a larger area, then the optical test region size can be increased. Meanwhile, the test location is usually at most a few micrometers square size.

The apparatus and method of invention are applicable when the sample is an optical disc, a magnetic disc, an integrated electronic circuit on a wafer, an opto-electronic circuit an optical grating or any other suitable sample. Whether the step of measuring the local parameter involves a mechanical, optical, magnetic, electric or other physical measurement it is performed in the nanometer range and employs the scanning probe tip. In other words, the measurement affects only a small fraction of the optical test region that is examined by the global test radiation. The local material parameter can be measured at an alternative test location within the optical region and averaged to ensure that the value used in computations is indeed substantially uniform over the optical test region. Given the many possible embodiments over and above those described above, the scope of the invention should be judged by the appended claims and their legal equivalents.

We claim:

1. An apparatus for integrated measurement of a sample having miniature features, said apparatus comprising:
    a) an optical measuring unit for illuminating said sample with a global test radiation over an optical test region and obtaining an optical response from said optical test region;
    b) a local measuring unit for measuring a local material parameter $\rho$ of said sample with a scanning probe tip at a test location within said optical test region, said local material parameter $\rho$ being selected to exhibit substantial uniformity over said optical test region;
    c) a computation unit for determining a property of said miniature features within said optical test region from said optical response supplemented with an adjustment derived from said local material parameter $\rho$.

2. The apparatus of claim 1, wherein said local measuring unit comprises a local mechanical unit for deforming said sample with said scanning probe tip at said test location.

3. The apparatus of claim 2, wherein said mechanical unit comprises a mechanical indenter for mechanically deforming said sample at said test location with said scanning probe tip.

4. The apparatus of claim 3, wherein said scanning probe tip comprises a hard tip of a material selected from the group consisting of diamond, tungsten, carbide and nitride.

5. The apparatus of claim 1, wherein said local measuring unit comprises a local optical unit for performing a nanometer range optical measurement at said test location with the aid of said scanning probe tip.

6. The apparatus of claim 5, wherein said scanning probe tip comprises a waveguide and said local optical unit delivers a local test radiation to said test location.

7. The apparatus of claim 6, wherein said scanning probe tip further comprises a structure for evanescent coupling of said local test radiation.

8. The apparatus of claim 1, wherein said local measuring unit comprises a local magnetic measurement unit for performing a nanometer range magnetic force measurement at said test location with the aid of said scanning probe tip.

9. The apparatus of claim 8, wherein said scanning probe tip comprises a magnetically susceptible coating.

10. The apparatus of claim 1, wherein said local measuring unit comprises a local electric measurement unit for performing a nanometer range electric force measurement at said test location with the aid of said scanning probe tip.

11. The apparatus of claim 10, wherein said scanning probe tip comprises an electrically susceptible material.

12. The apparatus of claim 1, further comprising a drive for oscillating said scanning probe tip.

13. The apparatus of claim 12, wherein said drive comprises a lateral drive for oscillating said scanning probe tip laterally.

14. The apparatus of claim 12, wherein said drive comprises a vertical drive for oscillating said scanning probe tip vertically.

15. The apparatus of claim 1, further comprising a scanning unit for scanning said probe tip within said optical test region.

16. The apparatus of claim 1, further comprising a mounting arrangement for holding said optical measuring unit and said local measuring unit at an offset.

17. The apparatus of claim 16, wherein said offset is substantially zero, such that said optical measuring unit and said local measuring unit perform a measurement at said test location within said optical test region.

18. The apparatus of claim 1, wherein said optical measuring unit comprises a broadband source for emitting said global test radiation over a broadband.

19. The apparatus of claim 18, wherein said broadband source comprises at least two sources for spanning different ranges of said broadband.

20. A method for integrated measurement of a sample having miniature features, said method comprising:
    a) illuminating said sample with a global test radiation over an optical test region;
    b) obtaining an optical response from said optical test region to said global test radiation;
    c) selecting a local material parameter $\rho$ exhibiting substantial uniformity over said optical test region;
    d) measuring said local material parameter $\rho$ of said sample with a scanning probe tip at a test location within said optical test region;

e) determining a property of said miniature features within said optical test region from said optical response supplemented with an adjustment derived from said local material parameter ρ.

21. The method of claim 20, wherein said optical response comprises a family of response graphs and said adjustment derived from said local material parameter ρ comprises an identifier for selecting a particular response graph.

22. The method of claim 20, wherein said global test radiation is broadband.

23. The method of claim 22, wherein said broadband comprises any sub-band of electromagnetic radiation between x-rays and far infrared.

24. The method of claim 20, wherein said step of measuring said local parameter comprises mechanically deforming said sample at said test location.

25. The method of claim 24, wherein said step of mechanically deforming comprises producing a deformation selected from the group consisting of elastic deformation, inelastic deformation and viscoelastic deformation.

26. The method of claim 24, wherein said step of mechanically deforming comprises producing a surface deformation by moving said scanning probe tip in a motion selected from the group consisting of indentations, punctures and scratches.

27. The method of claim 20, wherein said step of measuring said local parameter comprises performing a nanometer range optical measurement at said test location with the aid of said scanning probe tip.

28. The method of claim 27, wherein said nanometer range optical measurement comprises delivering to said test location a local test radiation.

29. The method of claim 28, further comprising coupling said local test radiation into said sample at said test location by evanescent coupling.

30. The method of claim 20, wherein said step of measuring said local parameter comprises performing a nanometer range magnetic force measurement at said test location with the aid of said scanning probe tip.

31. The method of claim 30, wherein said nanometer range magnetic force measurement is performed by providing said scanning probe tip with a magnetically susceptible coating.

32. The method of claim 20, wherein said step of measuring said local parameter comprises performing a nanometer range electric force measurement at said test location with the aid of said scanning probe tip.

33. The method of claim 32, wherein said nanometer range electric force measurement is performed by providing said scanning probe tip with an electrically susceptible coating.

34. The method of claim 20, further comprising scanning said probe tip.

35. The method of claim 34, wherein said scanning is performed in a line pattern.

36. The method of claim 34, wherein said scanning is performed in a two-dimensional pattern.

37. The method of claim 20, further comprising oscillating the scanning probe tip.

38. The method of claim 37, wherein said oscillating comprises oscillating said scanning probe tip laterally.

39. The method of claim 37, wherein said oscillating comprises oscillating said scanning probe tip vertically.

40. The method of claim 20, further comprising averaging said local material parameter from said test location and an alternative test location within said optical test region.

41. An apparatus for integrated measurement of a sample having miniature features, said apparatus comprising:
 a) an optical measuring unit for illuminating said sample with a global test radiation over an optical test region;
 b) a detector for obtaining an optical response from said optical test region;
 c) a local measuring unit for measuring a local material parameter of said sample with a scanning probe tip at a test location within said optical test region, said local material parameter being selected to exhibit substantial uniformity over said optical test region;
 d) a computation unit for determining a property of said miniature features within said optical test region from said optical response supplemented with an adjustment derived from said local material parameter.

42. The apparatus of claim 41, wherein said optical test region comprises at least 1 square millimeter of the surface of said sample.

43. The apparatus of claim 41, wherein said test location comprises at most 100 square nanometers of the surface of said sample.

44. The apparatus of claim 41, wherein said sample is selected from the group consisting of optical discs, magnetic discs, integrated electrical circuits, opto-electronic circuits and optical gratings.

45. The apparatus of claim 41, wherein said optical response comprises a reflected radiation and said detector is positioned to intercept said reflected radiation.

46. The apparatus of claim 41, wherein said optical response comprises a transmitted radiation and said detector is positioned to intercept said transmitted radiation.

* * * * *